(12) United States Patent
Rahman et al.

(10) Patent No.: US 9,730,248 B2
(45) Date of Patent: Aug. 8, 2017

(54) WIRELESS COMMUNICATION DEVICE, A NETWORK NODE AND METHODS THEREIN FOR IMPROVED RANDOM ACCESS

(71) Applicant: Telefonaktiebolaget LM Ericsson (publ), Stockholm (SE)

(72) Inventors: Imadur Rahman, Sollentuna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/442,581

(22) PCT Filed: May 12, 2015

(86) PCT No.: PCT/SE2015/050532
§ 371 (c)(1),
(2) Date: May 13, 2015

(87) PCT Pub. No.: WO2016/072901
PCT Pub. Date: May 12, 2016

(65) Prior Publication Data
US 2016/0338109 A1 Nov. 17, 2016

Related U.S. Application Data

(60) Provisional application No. 62/074,675, filed on Nov. 4, 2014.

(51) Int. Cl.
*H04W 74/08* (2009.01)
*H04W 56/00* (2009.01)
*H04W 76/02* (2009.01)

(52) U.S. Cl.
CPC ..... *H04W 74/0833* (2013.01); *H04W 56/005* (2013.01); *H04W 76/026* (2013.01)

(58) Field of Classification Search
None
See application file for complete search history.

(56) References Cited

U.S. PATENT DOCUMENTS 5,909,436 A * 6/1999 Engstrom ............. H04L 5/0053
370/206
6,711,139 B1 * 3/2004 Endo .................. H04B 7/18528
370/322
(Continued)

OTHER PUBLICATIONS

International Search Report and Written Opinion dated Aug. 7, 2015 for International Application Serial No. PCT/SE2015/050532, International Filing Date—May 12, 2015 consisting of 14-pages.
(Continued)

*Primary Examiner* — Bunjob Jaroenchonwanit
(74) *Attorney, Agent, or Firm* — Christopher & Weisberg, P.A.

(57) ABSTRACT

Embodiments herein relate to a communication device and a method performed by the communication device for enabling improved random access transmissions in a radio communications network. The communication device obtains information indicating a first random access channel configuration and also obtains information indicating at least a second random access channel configuration. Then, the communication device determine whether or not the at least second random access channel configuration is orthogonal to the first random access channel configuration. Furthermore, the communication device uses the result of the determining to determine the time required by the communication device to configure the at least second cell.

Embodiments herein also relate to a first network node and a method therein for enabling improved random access transmissions in a radio communications network.

26 Claims, 11 Drawing Sheets

(56) References Cited

U.S. PATENT DOCUMENTS

| | | | |
|---|---|---|---|
| 7,052,852 B1* | 5/2006 | Mullan | C12Q 1/6883 435/6.14 |
| 7,088,734 B2* | 8/2006 | Newberg | H04B 7/2656 370/329 |
| 8,184,609 B2* | 5/2012 | Khan | H04B 1/713 370/319 |
| 8,462,688 B1 | 6/2013 | Dinan | |
| 9,198,177 B2* | 11/2015 | Nanri | H04W 74/006 |
| 9,295,012 B2* | 3/2016 | Kim | H04W 52/146 |
| 2005/0254467 A1* | 11/2005 | Li | H04W 52/08 370/335 |
| 2006/0045047 A1* | 3/2006 | Choi | H04W 74/0866 370/329 |
| 2006/0050775 A1* | 3/2006 | Li | H04B 1/70754 375/150 |
| 2008/0049708 A1* | 2/2008 | Khan | H04B 1/713 370/343 |
| 2008/0267161 A1* | 10/2008 | Bertrand | H04W 16/02 370/347 |
| 2010/0002671 A1* | 1/2010 | Iwai | H04J 13/0074 370/342 |
| 2010/0034141 A1* | 2/2010 | Meylan | H04W 74/0833 370/328 |
| 2010/0069084 A1* | 3/2010 | Parkvall | H04B 1/7103 455/453 |
| 2012/0026952 A1* | 2/2012 | Okubo | H04W 74/008 370/329 |
| 2012/0063393 A1* | 3/2012 | Du | H04W 36/0077 370/329 |
| 2012/0155405 A1* | 6/2012 | You | H04W 74/0833 370/329 |
| 2012/0269149 A1* | 10/2012 | Okubo | H04W 72/1268 370/329 |
| 2012/0300714 A1* | 11/2012 | Ng | H04W 56/0045 370/329 |
| 2013/0021997 A1* | 1/2013 | Lee | H04W 74/0841 370/329 |
| 2013/0039195 A1* | 2/2013 | Weng | H04W 48/20 370/252 |
| 2013/0044665 A1* | 2/2013 | Ng | H04W 52/242 370/311 |
| 2013/0064226 A1* | 3/2013 | Dinan | H04W 36/30 370/332 |
| 2013/0114505 A1* | 5/2013 | Haim | H04W 52/146 370/328 |
| 2013/0148620 A1* | 6/2013 | Nanri | H04W 74/006 370/329 |
| 2013/0242730 A1* | 9/2013 | Pelletier | H04W 28/0284 370/230 |
| 2013/0301541 A1* | 11/2013 | Mukherjee | H04W 74/0833 370/329 |
| 2014/0254564 A1* | 9/2014 | Khude | H04W 16/10 370/336 |
| 2015/0023231 A1* | 1/2015 | Ji | H04B 7/2643 370/280 |
| 2015/0063245 A1* | 3/2015 | Gao | H04W 52/248 370/329 |
| 2015/0078264 A1* | 3/2015 | Han | H04W 74/0833 370/329 |
| 2015/0117287 A1* | 4/2015 | Kim | H04W 52/0216 370/311 |
| 2015/0163830 A1* | 6/2015 | Ahn | H04W 74/0833 370/280 |
| 2015/0327198 A1* | 11/2015 | Axmon | H04W 56/0045 370/336 |
| 2015/0358951 A1* | 12/2015 | Wang | H04L 5/0062 370/330 |
| 2016/0073431 A1* | 3/2016 | Park | H04W 72/1284 370/329 |
| 2016/0094975 A1* | 3/2016 | Sheng | H04W 72/042 370/216 |
| 2016/0174187 A1* | 6/2016 | Gopala Krishnan | H04W 68/02 455/458 |
| 2016/0205632 A1* | 7/2016 | Yi | H04W 52/146 455/522 |
| 2016/0205681 A1* | 7/2016 | Kim | H04B 7/2656 370/329 |

OTHER PUBLICATIONS

3GPP TSG-RAN WG1 Meeting #76, Prague, Czech Republic, R1-140479, Agenda Item: 5, Source: NEC, Title: "Discussion on Parallel PRACH Preamble Transmissions for Dual Connectivity", Document for: Discussion, Feb. 10-14, 2014 consisting of 6-pages.

3GPP TSG-RAN WG1 Meeting #76, Prague, Czech Republic, R1-140625, Source: NTT DoCoMo, Title: "Views on Open Issues for Dual Connectivity", Agenda Item: 7.2.5, Document for: Discussion and Decision, Feb. 10-14, 2014 consisting of 7-pages.

3GPP TSG-RAN WG1 Meeting #76bis, Shenzhen, China, R1-141287, Agenda Item: 7.2.4.2.1, Source: Samsung, Title: "Discussion on Small Cell on/off Scenarios and Procedures", Document for: Discussion and Decision, Mar. 31-Apr. 4, 2014 consisting of 13-pages.

3GPP TSG-RAN WG1 Meeting #76bis, Shenzhen, China, R1-141469, Source: NTT DoCoMo, Title: "Transmit Power Control for Dual Connectivity", Agenda Item: 7.2.5, Document for: Discussion and Decision, Mar. 31-Apr. 4, 2014 consisting of 8-pages.

3GPP TSG-RAN WG1 Meeting #79, Ljubljana, Slovenia, R1-144216, Agenda Item: 7.2.2.1, Source: InterDigital Communications, Title: "PRACH Prioritization and Handling", Document for: Discussion and Decision, Oct. 6-10, 2014 consisting of 5-pages.

\* cited by examiner

WIRELESS COMMUNICATION DEVICE, A NETWORK NODE AND METHODS THEREIN FOR IMPROVED RANDOM ACCESS

TECHNICAL FIELD

Embodiments herein relate to random access transmissions in a radio communications network. In particular, embodiments herein relate to a wireless communication device and a method therein for enabling improved random access transmissions in a radio communications network. Furthermore, embodiments herein also relate to a network node and method therein for enabling improved random access transmissions in a radio communications network.

BACKGROUND

In a typical radio communications network, wireless terminals, also known as mobile stations, terminals and/or user equipments, UEs, communicate via a Radio Access Network, RAN, to one or more core networks. The radio access network covers a geographical area which is divided into cell areas, with each cell area being served by a base station or network node, e.g. a radio base station, RBS, which in some networks may also be referred to as, for example, "NodeB", "eNB" or "eNodeB".

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations/network nodes connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially flat architecture comprising radio base station nodes without reporting to RNCs.

Random Access

In LTE, as in any communication system, a wireless communication device may need to contact the network, via the base station (eNodeB), without having a dedicated resource in the uplink, UL, i.e. from a wireless communication device to a base station. To handle this, a random access procedure is available where a wireless communication device that does not have a dedicated UL resource may transmit a signal to the base station. The first message of this procedure is typically transmitted on a special resource reserved for random access, a physical random access channel, PRACH. This channel may for instance be limited in time and/or frequency, as in LTE. This is illustrated in FIG. 1. The resources available for PRACH transmission is provided to the terminals as part of the broadcasted system information in system information block 2 (SIB-2) (or as part of dedicated RRC signaling in case of e.g. handover).

The resources consist of a preamble sequence and a time/frequency resource. In each cell, there are 64 preamble sequences available. Two subsets of the 64 sequences are defined, where the set of sequences in each subset is signaled as part of the system information. When performing a (contention-based) random-access attempt, the terminal selects at random one sequence in one of the subsets. As long as no other terminal is performing a random-access attempt using the same sequence at the same time instant, no collisions will occur and the attempt will, with a high likelihood, be detected by the eNodeB.

In LTE, the random access procedure may be used for a number of different reasons. Among these reasons are, for example: initial access (for wireless communication devices in the RRC_IDLE state), incoming handover, resynchronization of the UL, scheduling request (for a wireless communication device that is not allocated any other resource for contacting the base station), positioning, etc.

FIG. 2 illustrates the contention-based random access procedure used in LTE Rel-10, i.e. shows signalling over the air interface for the contention-based random access procedure in LTE.

The wireless communication device starts the random access procedure by randomly selecting one of the preambles available for contention-based random access. The wireless communication device then transmits the selected random access preamble on the physical random access channel (PRACH) to eNodeB in RAN. RACH is a transport channel which is transmitted by the wireless communication device over PRACH.

The RAN acknowledges any preamble it detects by transmitting a random access response (MSG2) including an initial grant to be used on the uplink shared channel, a temporary C-RNTI (TC-RNTI), and a time alignment (TA) update based on the timing offset of the preamble measured by the eNodeB on the PRACH. The MSG2 is transmitted in the DL to the wireless communication device using the PDSCH and its corresponding PDCCH message that schedules the PDSCH contains a cyclic redundancy check (CRC) which is scrambled with the RA-RNTI. When receiving the response the wireless communication device uses the grant to transmit a message (MSG3) that in part is used to trigger the establishment of radio resource control and in part to uniquely identify the wireless communication device on the common channels of the cell. The timing alignment command provided in the random access response is applied in the UL transmission in MSG3. In addition, the eNB may also change the resources blocks that are assigned for a MSG3 transmission by sending an UL grant that has its CRC scrambled with the TC-RNTI which was included in MSG2. In this case the PDCCH is used, to transmit the DCI containing the uplink grant. The MSG4, which is then contention resolving, has its PDCCH CRC scrambled with the C-RNTI if the wireless communication device previously has a C-RNTI assigned. If the wireless communication device does not have a C-RNTI previously assigned, it has its PDCCH CRC is scrambled with the TC-RNTI obtained from MSG2. The procedure ends with RAN solving any preamble contention that may have occurred for the case that multiple wireless communication devices transmitted the same preamble at the same time. This may occur since each wireless communication device randomly selects when to transmit and which preamble to use. If multiple wireless communication devices select the same preamble for the transmission on RACH, there will be contention between these wireless communication devices that needs to be resolved through the contention resolution message (MSG4).

The case when contention occurs is illustrated in FIG. 3. FIG. 3 illustrates contention based random access, where there is contention between two wireless communication devices. Here, two wireless communication devices transmit the same preamble, $p_5$, at the same time. A third wireless communication device also transmits at the same time and the same RACH, but since it transmits with a different preamble, pi, there is no contention between this wireless communication device and the other two wireless communication devices.

The wireless communication device may also perform non-contention based random access. A non-contention based random access or contention free random access may e.g. be initiated by the eNB to get the wireless communication device to achieve synchronisation in UL. The eNB initiates a non-contention based random access either by sending a PDCCH order or indicating it in an RRC message. The later of the two is used in case of HO.

The eNB may also order the wireless communication device through a PDCCH message to perform a contention based random access; the procedure for this is illustrated in FIG. 3. The procedure for the wireless communication device to perform contention free random access is illustrated below in FIG. 4. Similar to the contention based random access the MSG2 is transmitted in the DL to the wireless communication device and its corresponding PDCCH message CRC is scrambled with the RA-RNTI. The wireless communication device considers the contention resolution successfully completed after it has received MSG2 successfully. For the contention free random access as for the contention based random access does the MSG2 contain a timing alignment value. This enables the eNB to set the initial/updated timing according to the wireless communication devices transmitted preamble.

FIG. 4 shows signalling over the air interface for the contention-free random access procedure in LTE.

Dual Connectivity

A dual connectivity framework is currently being considered for LTE Rel-12. Dual Connectivity, DC, refers to the operation where a given wireless communication device consumes radio resources provided by at least two different network points, i.e. a Master eNB, MeNB, and a Secondary eNB, SeNB, connected with non-ideal backhaul while in RRC_CONNECTED. A wireless communication device in dual connectivity maintains simultaneous connections to anchor and booster nodes, where the MeNB is interchangeably called an anchor node is and the SeNB is interchangeably called a booster node. As the name implies, the MeNB controls the connection and handover of SeNB. No SeNB standalone handover is defined for Rel-12. Signaling in MeNB is needed even in SeNB change. Both the anchor node and booster node may terminate the control plane connection towards the wireless communication device and may thus be the controlling nodes of the wireless communication device.

The wireless communication device reads system information from the anchor node. In addition to the anchor node, the wireless communication device may be connected to one or several booster nodes for added user plane support. The MeNB and SeNB are connected via the Xn interface, which is currently selected to be the same as the X2 interface between two eNBs.

More specifically dual connectivity (DC) is a mode of operation of a wireless communication device in RRC_CONNECTED state, where the wireless communication device is configured with a Master Cell Group (MCG) and a Secondary Cell Group (SCG). Cell Group (CG) is a group of serving cells associated with either the MeNB or the SeNB.

The MCG and SCG are defined as follows:
  Master Cell Group (MCG) is a group of serving cells associated with the MeNB, comprising of the PCell and optionally one or more SCells.
  Secondary Cell Group (SCG) is a group of serving cells associated with the SeNB comprising of PSCell (Primary SCell) and optionally one or more SCells Master eNB is the eNB which terminates at least S1-MME. Secondary eNB is the eNB that is providing additional radio resources for the wireless communication device but is not the Master eNB.

FIG. 5 illustrates a dual connectivity deployment scenario. Here, a dual connectivity setup is described. In this example, only one SeNB is connected to wireless communication device, however, more than one SeNB may serve the wireless communication device in general. As shown in FIG. 5, it is also clear that dual connectivity is a specific feature of the wireless communication device and a network node may support a dual connected wireless communication device and a legacy wireless communication device at the same time. As mentioned earlier, the anchor and booster roles are defined from a point of view of the wireless communication device. This means that a node that acts as an anchor to one wireless communication device may act as booster to another wireless communication device. Similarly, though the wireless communication device reads the system information from the anchor node, a node acting as a booster to one wireless communication device, may or may not distribute system information to another wireless communication device. It is worth mentioning here that, we have used anchor node and MeNB with interchangeable meaning, similarly, SeNB and booster node is also used interchangeably in the document.

MeNB may provide system information, terminate control plane and may also terminate user plane. SeNB may terminate control plane and may also terminate only user plane.

In one implementation, dual connectivity allows a wireless communication device to be connected to two nodes to receive data from both nodes to increase its data rate. This user plane aggregation achieves similar benefits as carrier aggregation using network nodes that are not connected by low-latency backhaul/network connection, also referred to as an ideal backhaul. Due to this lack of low-latency backhaul, the scheduling and HARQ-ACK feedback from the wireless communication device to each of the nodes will need to be performed separately. That is, it is expected that the wireless communication device shall have two UL transmitters to transmit UL control and data to the connected nodes.

PSCell activation in dual connectivity

In dual connectivity the wireless communication device is connected to two eNodeBs simultaneously, i.e. to MeNB and SeNB. Each of them may have one or more associated SCells which may be configured for downlink (DL) Carrier Aggregation (CA) operation, or downlink (DL) and uplink (UL) CA operation. The SCells are time-aligned to the MeNB and SeNB, respectively, but the MeNB and SeNB may or may not be time aligned with respect to frame timing and/or Serial Frame Number, SFN. Two modes of operation are defined:

Synchronized operation, where the downlink frame time difference between PCell and PSCell is within ±33 us, and Unsynchronized operation, where the time difference between PCell and PSCell is arbitrary but limited to 0.5 ms.

With respect the PSCell it has been agreed that the PSCell is configured by the PCell (i.e. by MeNB), and that the PSCell is activated at the configuration and cannot be deactivated by MeNB or SeNB. Configuration and simultaneous activation of PSCell is done by MeNB, but otherwise the MeNB and SeNB operate the wireless communication device independently. Particularly, when the wireless communication device gets the SeNB activated it first has to carry out random access towards PSCell to establish a connection and get allocations so that it may send a first CQI report indicating the quality of the link as well as confirming that the activation has been successful.

SUMMARY

It is an object of embodiments herein to improve random access transmissions in a radio communications network.

According to a first aspect of embodiments herein, the object is achieved by a method performed by a communication device for enabling improved random access transmissions in a radio communications network. The communication device is configurable for dual connectivity in a first cell of a first network node and at least a second cell of at least a second network node. The communication device obtains information indicating a first random access channel configuration used in the first cell. Also, the communication device obtains information indicating at least a second random access channel configuration used in the at least second cell. Then, the communication device determine whether or not the at least second random access channel configuration is orthogonal to the first random access channel configuration. Furthermore, the communication device uses the result of the determining to determine the time required by the communication device to configure the at least second cell.

According to a second aspect of embodiments herein, the object is achieved by a communication device for enabling improved random access transmissions in a radio communications network, wherein the communication device is configurable for dual connectivity in a first cell of a first network node and at least a second cell of at least a second network node. The communication device is configured to obtain information indicating a first random access channel configuration used in the first cell, obtain information indicating at least a second random access channel configuration used in the at least second cell, determine whether or not the at least second random access channel configuration is orthogonal to the first random access channel configuration, and use the result of the determining to determine the time required by the communication device to configure the at least second cell.

According to a third aspect of embodiments herein, the object is achieved by a method performed by a first network node for enabling improved random access transmissions of a communication device in a radio communications network, wherein the communication device is configurable for dual connectivity in a first cell of the first network node and at least a second cell of at least a second network node. The first network node obtains information indicating at least a second random access channel configuration used in the at least second cell. Then, the first network node determines whether or not the at least second random access channel configuration is orthogonal to a first random access channel configuration in the first cell. Also, the first network node uses the result of the determining to determine the time required by the communication device to configure the at least second cell.

According to a fourth aspect of embodiments herein, the object is achieved by a first network node for enabling improved random access transmissions of a communication device in a radio communications network, wherein the communication device is configurable for dual connectivity in a first cell of the first network node and at least a second cell of at least a second network node. The first network node is configured to obtain information indicating at least a second random access channel configuration used in the at least second cell, determine whether or not the at least second random access channel configuration is orthogonal to a first random access channel configuration in the first cell, and using the result of the determining to determine the time required by the communication device to configure the at least second cell.

By having a communication device and/or a first network node configured as described above, delays in the configuration and activation of the at least second cell may be avoided or minimized. Hence, random access transmissions in the radio communications network are improved.

BRIEF DESCRIPTION OF THE DRAWINGS

Embodiments will now be described in more detail in relation to the enclosed drawings.

DETAILED DESCRIPTION

Figure 1:
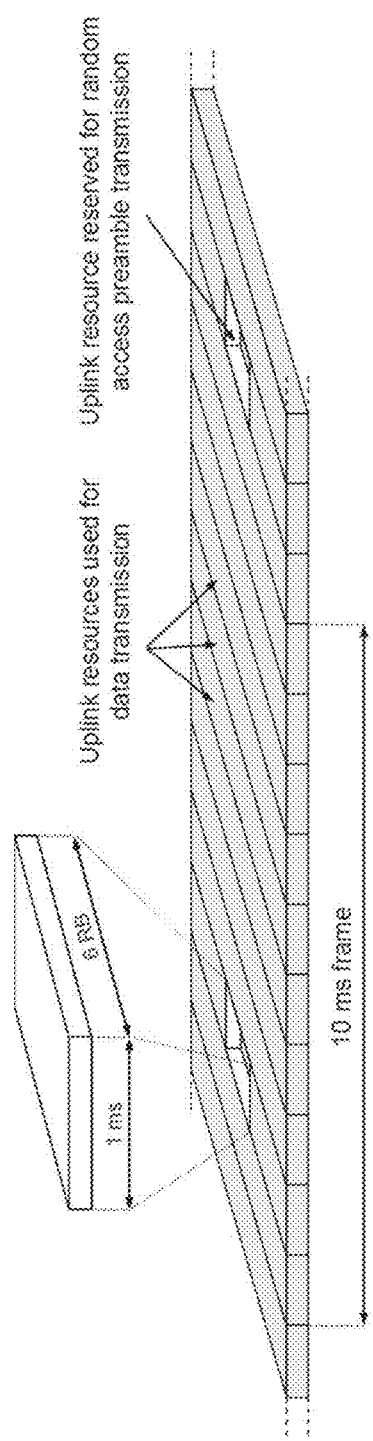
FIG. 1 is a schematic illustration of a random access preamble transmission.
Figure 2:
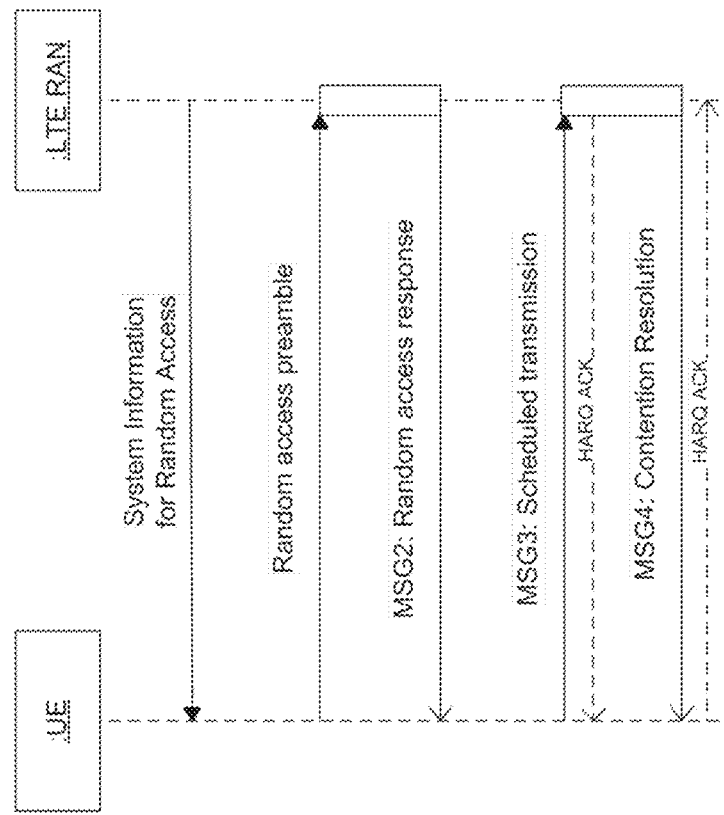
FIG. 2 is a signalling diagram depicting the signalling of a contention-based random access procedure in LTE.
Figure 3:
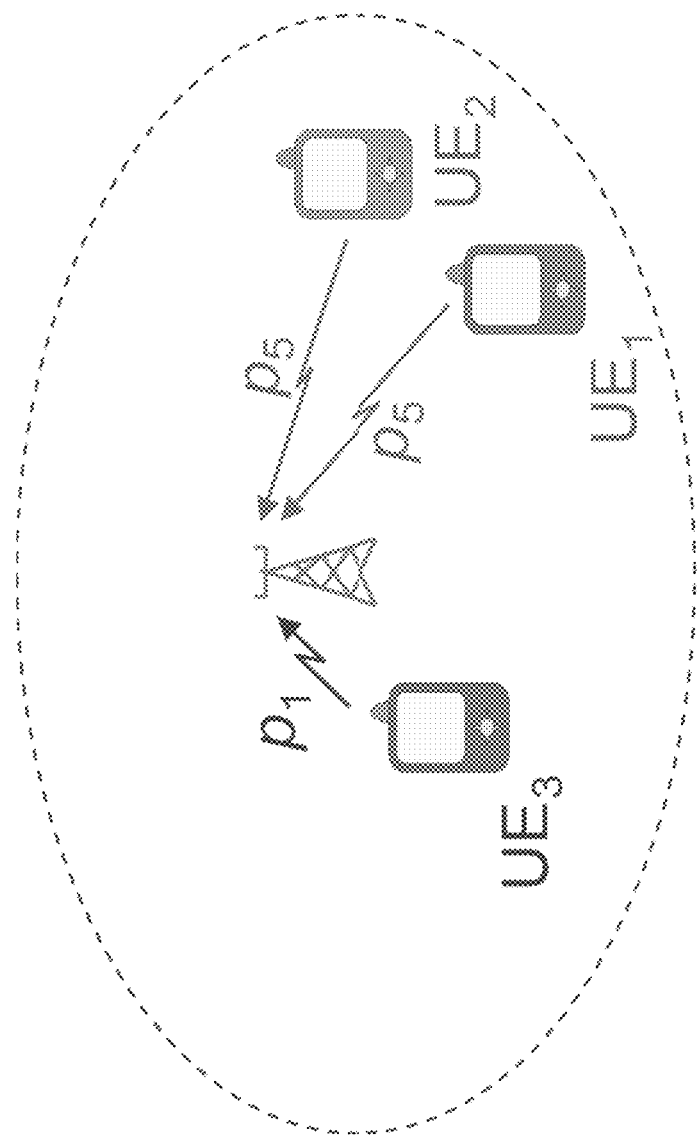
FIG. 3 is a schematic block diagram illustrating wireless communication devices and a network node in a radio communications network.
Figure 4:
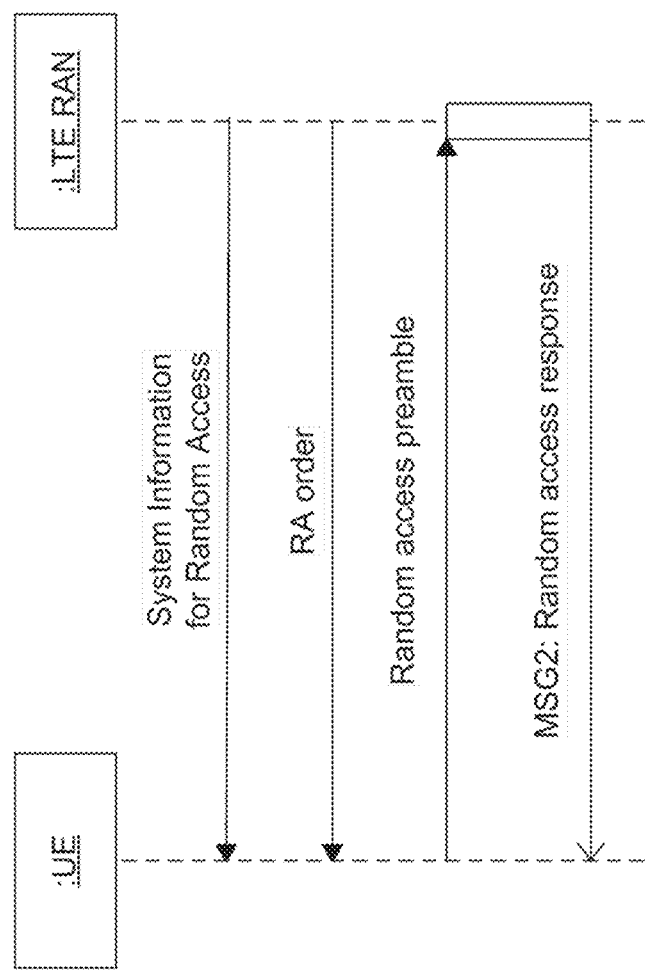
FIG. 4 is a signalling diagram depicting the signalling of a contention-free random access procedure in LTE.
Figure 5:
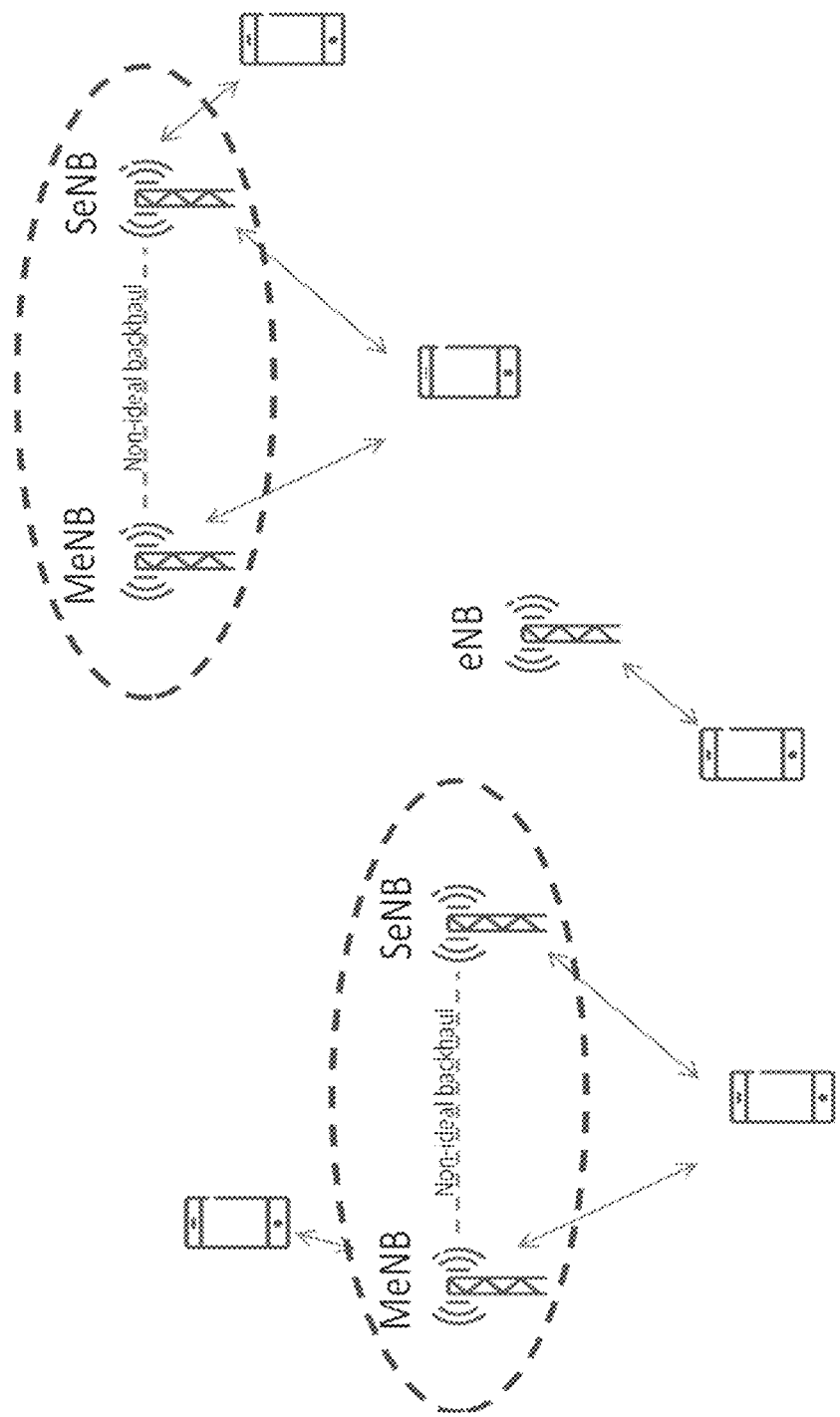
FIG. 5 is a schematic block diagram illustrating wireless communication devices and a network node in a dual connectivity deployment scenario.

The figures herein are schematic and simplified for clarity, and they merely show details which are essential to the understanding of the embodiments presented herein, while other details have been left out. Throughout, the same reference numerals are used for identical or corresponding parts or steps.

Figure 6:
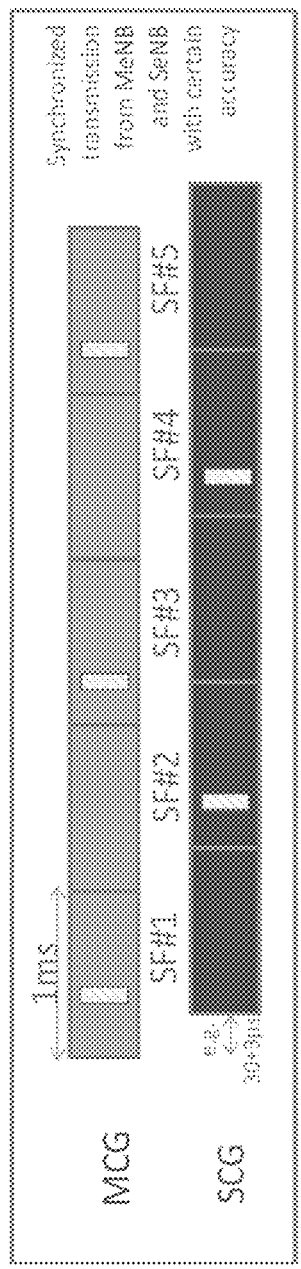
FIG. 6 is a schematic block diagram depicting an example of orthogonal random access.
Figure 7:
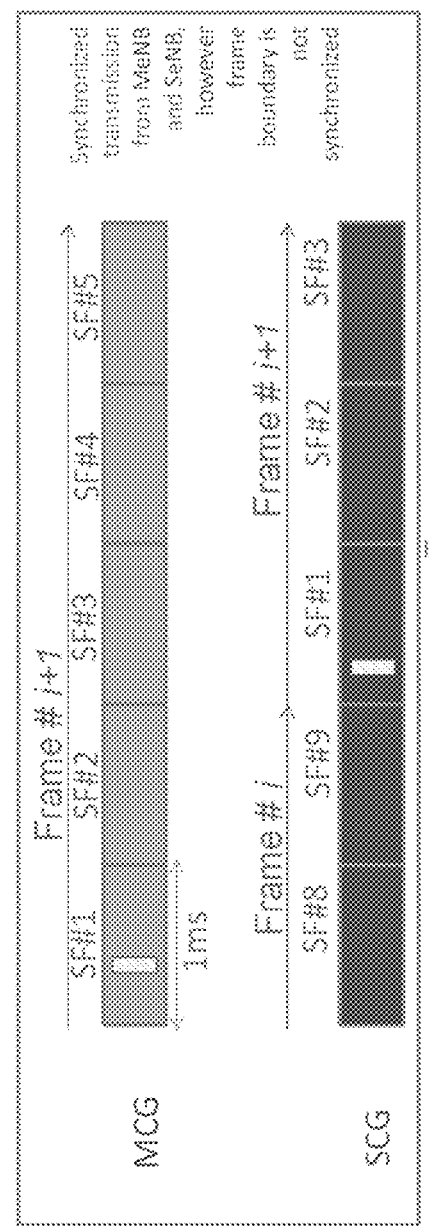
FIG. 7 is a schematic block diagram depicting another example of orthogonal random access.

A general description of scenarios enabling orthogonal PRACH configurations is described below with respect to FIG. 6-7 to help understanding the embodiments described herein. FIG. 6 shows orthogonal RACH transmission for different CGs. FIG. 7 shows orthogonal PRACH transmission when frame boundary is not aligned.

The basic scenario comprises of a CA capable wireless communication device configured with a first serving cell operating on a first carrier frequency, f1, and the wireless communication device is also capable of being served by at least one more serving cell also known as second serving cell operating on another carrier, f2. The wireless communication device may further be capable of being served by more than two serving cells also known as SCells. At least the wireless communication device is capable of being served by the first and second serving cells in both downlink and uplink.

The first serving cell and the second serving cell are served by a first network node and a second network node respectively. In some embodiments the first and the second network nodes may be the same.

The first serving cell and the second serving cell are configured with a first PRACH configuration and a second PRACH configuration respectively. The PRACH configuration herein means that it comprises of one or more parameters that are associated with a radio resource where a wireless communication device may send a PRACH. The radio resource is an occasion (e.g. subframe, set of resource blocks) in a cell where the wireless communication device sends a PRACH. The random access transmission to the first cell may herein also be referred to as a first PRACH (i.e. PCell PRACH in DC). The random access transmission to the second cell may herein also be referred to as a second PRACH (i.e. PSCell PRACH in DC).

In some embodiments, the first and the second PRACH configurations are configured to be orthogonal to each other. The term "orthogonal PRACH configuration" implies that the first PRACH and second PRACH occasions occur during non-overlapping times. This allows the wireless communication device to send PRACH in the first cell and in the second cell at different times or time periods i.e. not in parallel. Examples of such time periods are subframes, frames, time slot, symbol(s), PRACH transmission time slot, PRACH period, PRACH duration, etc. The term orthogonal PRACH configurations may interchangeably be called as simply orthogonal PRACHs, non-overlapping PRACHs, PRACH configurations or operations in non-overlapping times or in orthogonal times etc. It should also be noted that, according to some embodiments, the "orthogonal PRACH configuration" may also imply that the first PRACH and second PRACH occur on different cells, i.e. the different cells may operate on different frequencies, e.g. carriers with different center frequencies. Examples of different frequencies are inter-frequency carriers, component carriers involved in carrier aggregation, component carriers involved in dual connectivity, etc.

The concept of the orthogonal PRACH configuration is explained with few examples below:

In a first example, it is assumed that the radio frames of the first cell and the second cell are time aligned (e.g. difference between the start of their radio frames is less than 3 μs). Their uplink radio frames also have the same timing relations as between their downlink radio frames. In this case as an example the first PRACH and the second PRACH may be configured in subframe #1 and subframe #2 in the first and the second cells respectively; this will ensure orthogonality between the two PRACHs. This is illustrated in FIG. 6.

In a second example, it is assumed that the subframes of the first cell and the second cell are time aligned (e.g. difference between the start of their subframes is less than 3 μs). But their radio frames are not time aligned and instead shifted by 2 subframes with respect to each other. Their uplink radio frames and subframes also have the same timing relations as between their downlink radio frames and subframes respectively. In this case as an example the first PRACH and the second PRACH may be configured in subframe #1 and also subframe #1 in the first and the second cells respectively; this will still maintain the orthogonality between the two PRACHs. This is illustrated in FIG. 7.

In a third example, it is assumed that the first cell and the second cell have arbitrary transmit timing, i.e. there is no well-defined timing relation between the transmit timings of their frames or subframes. In this case, in one example, the first PRACH and the second PRACH may be configured in the beginning of the radio frame in the first cell and at the end of the radio frame in the second cell respectively or vice versa. In yet another example, the first PRACH and the second PRACH may be configured in different radio frames to ensure that they don't overlap in time. In that case, the above figures may have very different boundaries with respect to subframe timing and also for frame timing.

In some embodiments there may be yet a third cell with a third PRACH configuration. The embodiments are applicable for any number of cells and their PRACH configurations.

As a special case, the first serving cell and the second serving cell are the PCell and PSCell respectively of the wireless communication device and belong to MCG and SCG respectively in a DC operation. Also, in the DC operation, the first serving cell and the second serving cell are served or managed by the MeNB and SeNB, respectively.

Figure 8:
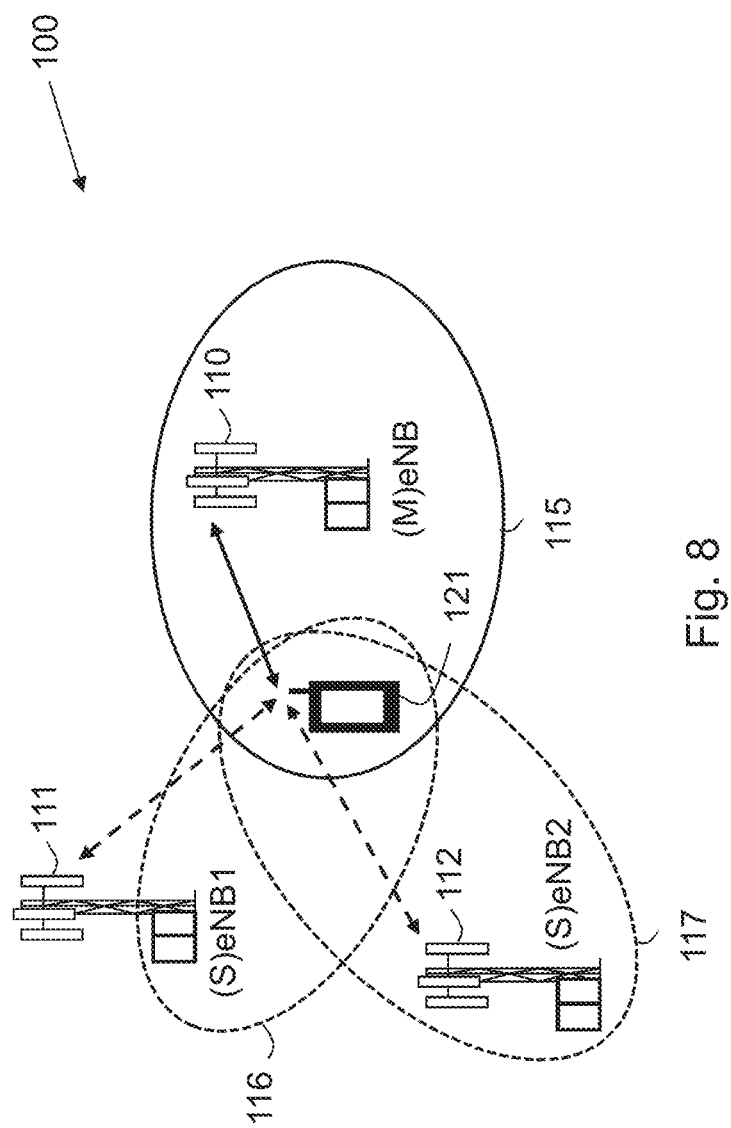
FIG. 8 is a schematic block diagram illustrating embodiments of a wireless communication device and a network node in a radio communications network.

FIG. 8 depicts a radio communications network 100 in which embodiments herein may be implemented. In some embodiments, the radio communications network 100 may be a wireless communications network such as a Long Term Evolution (LTE) network. Although, the radio communication network 100 is exemplified herein as an LTE network, the radio communications network 100 may also employ technology of any one of LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar cellular network or system.

The radio communications system 100 comprises a network node 110. The network node 110 serves at least one cell 115. The network node 110 may correspond to any type of radio network node or any network node, which communicates with a wireless communication device and/or with another network node, such as, e.g. be a base station, a radio base station, eNB, eNodeB, a Home Node B, a Home eNode B, femto Base Station (BS), pico BS, etc. Further examples of the network node 110 may also be e.g. a repeater, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, a Remote Radio Unit (RRU), a Remote Radio Head (RRH), nodes in distributed antenna system (DAS), core network node (e.g. MSC, MME, etc.), O&M, OSS, SON, positioning node (e.g. E-SMLC), MDT, etc.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 115 uniquely in the whole radio communication network 100 is also broadcasted in the cell 115. The network node 110 communicates over the air or radio interface operating on radio frequencies with the UEs within range of the network node 110.

In FIG. 1, a wireless communication device 121 is located within the cell 115. The wireless communication device 121 is configured to communicate within the radio communications network 100 via the network node 110 over a radio link 131 when present in the cell 115 served by the network node 110. The wireless communication device 121 may refer to any type of communication device or user equipment (UE) communicating with a network node and/or with another communication device in a cellular, mobile or radio communication network or system. Examples of such a wireless communication device are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), target device, device-to-device (D2D) wireless device, wireless device capable of machine to machine (M2M) communication, etc.

As shown in FIG. 1, the radio communications system 100 may further comprises a second and a third network node 111, 112. The network node 111, 112 serves at least one cell 116, 117. The second and third network node 111, 112 may also be configured to serve the wireless communication device 121 in the at least one cell 116, 117, i.e. as secondary cells, when operating in Dual Connectivity, DC, mode.

As part of the developing of the embodiments described herein, a problem will first be identified and discussed.

A wireless communication device being configured in dual connectivity mode, or DC mode, may receive a request from its PCell in its Master Cell Group, MCG, to configure and activate a secondary cell, PSCell, belonging to Secondary Cell Group, SCG, in dual connectivity operation. In response to the request, the configuration and activation procedure for the PSCell may be initiated by the wireless communication device. This procedure is completed when the wireless communication device has successfully sent a random access, RA, transmission to the PSCell, also commonly referred to as PSCell Random Access CHannel, PSCell RACH, or PSCell Physical Random Access CHannel, PSCell PRACH. However, during or at the start of such procedure the wireless communication device may also have to send another RA to PCell due to one or several reasons. An example of such a reason may be for arrival of data in the wireless communication device buffer while the wireless communication device has no valid uplink grant, positioning requests, expiry of TA timer, etc. The wireless communication device may not be able to simultaneous perform RA transmissions to PSCell and PCell, especially due to uplink power limitation, since the wireless communication device may not be able to transmit more than its maximum power, such as, for example, 23 dBm.

In case of simultaneous RA transmissions to PSCell and PCell, it has been agreed that the wireless communication device is required to prioritize the RA transmission to the PCell, i.e. the transmission of PCell PRACH, and withhold the RA transmission to the PSCell, i.e. the transmission of PSCell PRACH, unless the former is successfully transmitted.

There may also be failure in one or more attempts to transmit PCell PRACH. This may, for example, be due to collision with RA transmissions sent by other wireless communication devices, interference, etc. Because of such factors, the PSCell PRACH may be delayed over an arbitrary and unpredictable amount of time. This, in turn, will delay the configuration and activation of the PSCell. Also, in case the delay is too long, e.g. one or more frames, then the wireless communication device may not be able to be scheduled on PSCell SCG, which will thus therefore also affect the user performance.

A solution is therefore needed to avoid or at least minimize such delay in the configuration and activation of the PSCell. This issue is addressed by the embodiments presented herein.

Figure 9:
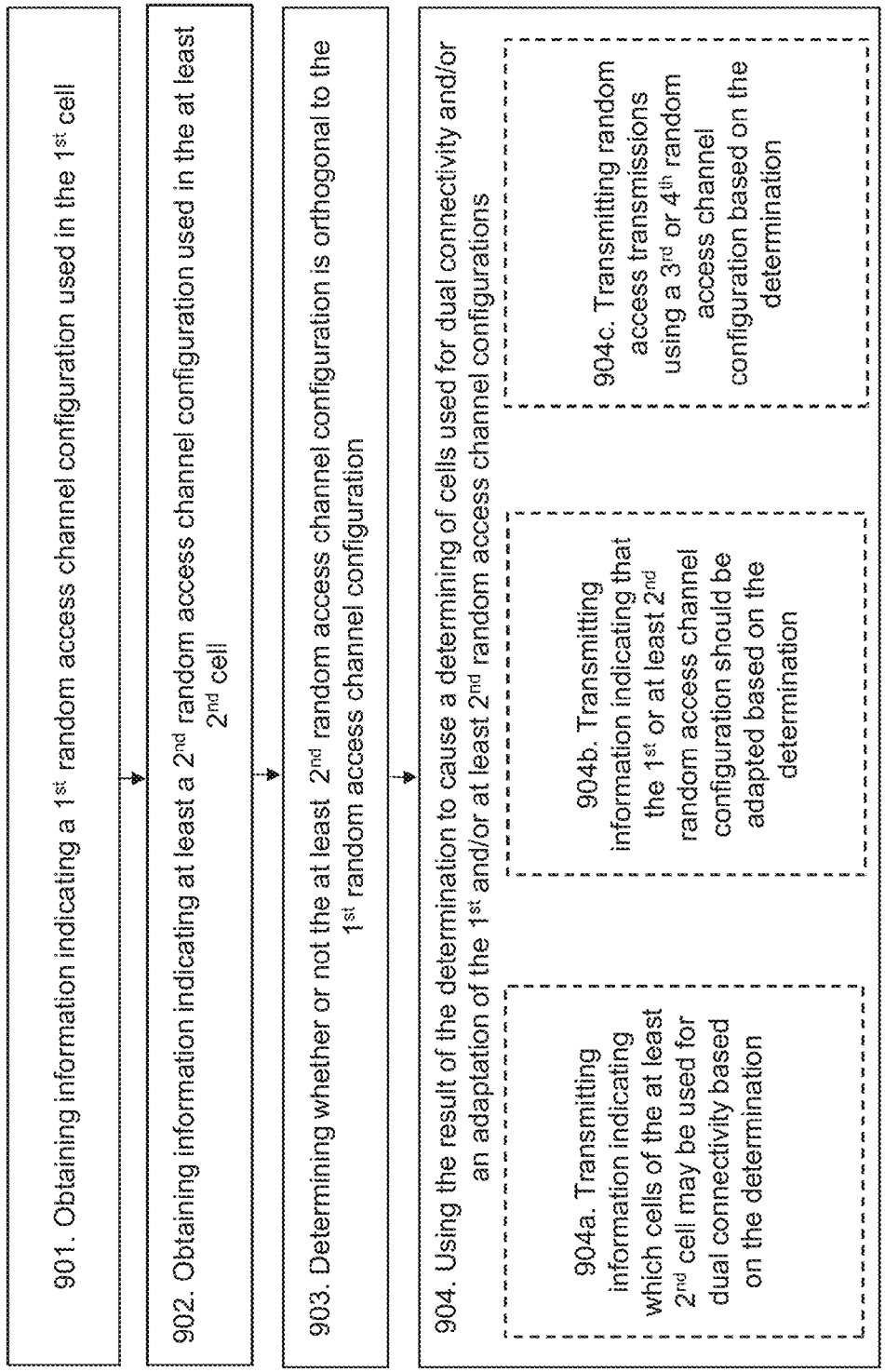
FIG. 9 is a flowchart depicting embodiments of a method in a wireless communication device.

Example of embodiments of a method performed by a wireless communication device 121 for enabling improved random access transmissions in a radio communications network 100 will now be described with reference to the flowchart depicted in FIG. 9. FIG. 9 illustrates an example of actions or operations which may be taken by the wireless communication device 121.

The wireless communication device 121 is configurable for dual connectivity in a first cell 115 of a first network node 110 and at least a second cell 116, 117 of at least a second network node 111, 112.

Action 901

First, wireless communication device 121 obtains information indicating a first random access channel configuration used in the first cell 115. This may, for example, be performed by the wireless communication device 121 by obtaining System Information, SI, which comprises the PRACH configuration, i.e. the at least second random access channel configuration, of one or more cells. The SI, e.g. Master Information Block, MIB, System Information Blocks, SIBs, etc., may be obtained by the wireless communication device 121 by itself acquiring the SI of the cells or it may receive this from one of its serving cells.

Action 902

The wireless communication device 121 here also obtains information indicating at least a second random access channel configuration used in the at least second cell 116, 117. This may, for example, be performed by the wireless communication device 121 by obtaining System Information, SI, which comprises the PRACH configuration, i.e. the at least second random access channel configuration, of one or more cells. The SI, e.g. Master Information Block, MIB, System Information Blocks, SIBs, etc., may be obtained by the wireless communication device 121 by itself acquiring the SI of the cells or it may receive this from one of its serving cells.

Action 903

In this action, wireless communication device 121 determines whether or not the at least second random access channel configuration is orthogonal to the first random access channel configuration. The first and the second random access channel configurations may be considered orthogonal with respect to each other if their respective random access occasions occur in different time resources.

Action 904

After the determination in Action 903, the wireless communication device 121 uses the result of the determination in Action 903 to cause a determination of cells used for dual connectivity and/or an adaptation of the first or at least second random access channel configuration.

Action 904a

In some embodiments, the wireless communication device 121 transmit, to the first network node 110 and/or the at least second network node 111, 112, information indicating which of the at least second cell 116, 117 may be used for dual connectivity based on the determination in Action 903. These embodiments may be referred to as a method performed by the wireless communication device 121 for recommending cells as serving cells based on PRACH configuration.

In some of these embodiments, the wireless communication device 121 configured in DC or being configured in DC or that is capable of DC operation, may autonomously determine one or more potential serving cells with respect to the relation between their PRACH configurations. By obtain PRACH configurations of two or more cells and based on that determine whether the PRACH configurations are orthogonal or not, as described in Actions 901-903, the wireless communication device 121 may select a potential set of serving cells that have orthogonal PRACH configurations. In case the wireless communication device 121 determines several cells, L, with orthogonal PRACH configurations, the wireless communication device 121 may select M number of cells, where M<L, as potential cells based on one or more additional criteria.

For example, in some embodiments, the wireless communication device 121 may determine the cells of the at least second cell 116, 117 which may be used for dual connectivity based on the signal quality of the cells at the wireless communication device 121. For example, M number of cells out of L cells that have the strongest signal quality levels at the wireless communication device 121, e.g. the cells having the largest RSRQ measured by the wireless communication device 121, are selected as potential serving cells. Alternatively, in some embodiments, the wireless communication device 121 may determine the cells of the at least second cell 116, 117 which may be used for dual connectivity based on when the next random access transmissions occurs in respective cell. For example, M number of cells out of L cells whose PRACH transmission occasions are farthest in time are selected as potential serving cells.

In some embodiments, the information indicating which of the at least second cell 116, 117 may be used for dual connectivity may further indicate which cells of the at least second cell 116, 117 may be used as the primary cell, PSCell, for the wireless communication device 121 when operating in dual connectivity, and which cells of the at least second cell 116, 117 may be used as secondary PCell, SCell, for the wireless communication device 121 when operating in dual connectivity. For example, upon selecting M cells as the potential serving cells with respect to their PRACH configurations, the wireless communication device 121 may provides information about these recommended serving cells to the serving cell. The wireless communication device 121 may even provide information about the cell(s) that are recommended to be used as PCell and/or the cell(s) that are recommended to be used as PSCell for DC operation. A network node 110, 111, 112 receiving the above recommendation from the wireless communication device 121 may use this for configuring or reconfiguring the PCell and/or PSCell of the wireless communication device 121 for DC operation.

Action 904b

In some embodiments, the wireless communication device 121 transmit, to the first network node 110 and/or the at least second network node 111, 112, information indicating that the first or at least second random access channel configuration should be adapted based on the determination in Action 903. This means that the wireless communication device 121 may implicitly or explicitly inform a network node that it needs to transmit using different PRACH configuration, e.g. different PRACH index, in a serving cell, e.g. PCell or PSCell, compared to the currently PRACH configuration, e.g. a current PRACH index. These embodiments may be referred to as a method performed by the wireless communication device 121 for informing a network node of the need for orthogonal PRACH resources.

In some of these embodiments, this may be performed by the wireless communication device 121 based on expected or occurred failures or delays of random access transmissions by the wireless communication device 121 using the first or at least second random access channel configurations. In other words, the wireless communication device 121 may inform a network node in case there is a PRACH failure or a delay in the PRACH transmission in the PCell and/or the PSCell. The PRACH failure or delay may occur when, in the wireless communication device 121, there is a simultaneous occurrence or need for simultaneous transmission of PRACHs towards the PCell and PSCell.

In some embodiments, the wireless communication device 121 may implicitly inform the network node by informing the network node about the statistics related to the number of times the PRACH has or typically fails and/or has or typically delayed. This means that the information may further indicates statistical information based on expected or occurred failures or delays of random access transmissions by the wireless communication device 121 using the first or at least second random access channel configurations. Optionally, in some embodiments, the wireless communication device 121 may explicitly request the network node that the current PRACH configuration(s) in the PCell and/or PSCell need to be changed such that the PRACH configurations in the PSCell and PCell become orthogonal with respect to each other. This means that the information comprises an explicit request to the first network node 110 and/or the at least second network node 111, 112 to change the first or at least second random access channel configuration such that the first and at least second random access channel configurations are orthogonal with respect to each other.

Hence, a network node, such as, the first network node 110 and/or the at least second network node 111, 112, may upon obtaining the above implicit or explicit information may adapt its PRACH configuration and/or request one or more neighboring network nodes to adapt their PRACH configurations such that they become orthogonal with respect to each other. Also, in some embodiments, the network node(s) may adapt its PRACH configuration or request other network nodes to adapt their PRACH configurations based on request received from two or more wireless communication devices, i.e. based on statistics.

Action 904c

In some embodiments, the wireless communication device 121 may transmit random access transmissions using a third and at least fourth random access channel configurations instead of the first or at least second random access channel configuration, which third and at least fourth random access channel configurations are subset to first and at least second random access channel configurations respectively and orthogonal to each other based on the determination in Action 903. These embodiments may be referred to as a method performed by the wireless communication device 121 for autonomous orthogonal PRACH transmission. This is because here the wireless communication device 121 may autonomously decide to transmit PRACH in orthogonal manner.

For example, when a wireless communication device 121 finds out that the wireless communication device 121 is power limited, then the wireless communication device 121 may itself decide on the orthogonal PRACH transmission pattern by using different PRACH configurations for different Cell Groups, CGs. This pattern may or may not be transmitted to the network. Thus, in some embodiments, the wireless communication device 121 may determine whether or not the transmission power that is available for simultaneous random access transmissions using the first and/or at least second random access channel configuration is below a determined threshold, and, in case the available transmission power is below the determined threshold, perform orthogonal random access transmissions using the third and at least fourth random access channel configuration. Also, the wireless communication device 121 may transmit the transmitting the third and/or at least fourth random access channel configuration to the first network node 110 and/or the at least second network node 111, 112.

As seen in the Table 5.7.1-2 of 3GPP TS 36.211 v. 12.3.0 (2014 September) below, the wireless communication device 121 may choose PRACH configuration index 0 for MCG and PRACH configuration index 4 for SCG. In this way, the PRACH transmissions may be orthogonal. In some embodiments, if involved nodes configure RACH resources with PRCH configuration 14, the wireless communication device 121 may send PRACH to MCG and SCG using PRACH configuration 12 and 13, respectively. This will ensure that the PRACH transmissions towards different CGs are orthogonal to each other. This will work fine for synchronized dual connectivity. In case of unsynchronized mode of dual connectivity, the wireless communication device 121 may use PRACH configuration 9 and 11 respectively. Similar approach may be applied to both TDD and FDD systems, or in mixed TDD and FDD systems.

TABLE 5.7.1-2

Frame structure type 1 random access configuration for preamble formats 0-3

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |

TABLE 5.7.1-2-continued

Frame structure type 1 random access configuration for preamble formats 0-3

| PRACH Configuration Index | Preamble Format | System frame number | Subframe number |
|---|---|---|---|
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

For frame structure type 2 with preamble formats 0-4, there might be multiple random access resources in an UL subframe (or UpPTS for preamble format 4) depending on the UL/DL configuration.

Table 5.7.1-3 lists PRACH configurations allowed for frame structure type 2 where the configuration index corresponds to a certain combination of preamble format, PRACH density value, $D_{RA}$ and version index, $r^{RA}$. The parameter prach-ConfigurationIndex is given by higher layers. For frame structure type 2 with PRACH configuration 0, 1, 2, 20, 21, 22, 30, 31, 32, 40, 41, 42, 48, 49, 50, or with PRACH configuration 51, 53, 54, 55, 56, 57 in UL/DL configuration 3, 4, 5, the UE may for handover purposes assume an absolute value of the relative time difference between radio frame i in the current cell and the target cell is less than $153600 \cdot T_s$.

TABLE 5.7.1-3

Frame structure type 2 random access configurations for preamble formats 0-4

| PRACH configuration Index | Preamble Format | Density Per 10 ms $D_{RA}$ | Version $r_{RA}$ |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |
| 58 | N/A | N/A | N/A |
| 59 | N/A | N/A | N/A |
| 60 | N/A | N/A | N/A |
| 61 | N/A | N/A | N/A |
| 62 | N/A | N/A | N/A |
| 63 | N/A | N/A | N/A |

According to a further aspect of the method performed by the wireless communication device 121 described above, the method may also be described as: obtaining information about a first PRACH configuration for PRACH transmission in a first serving cell of the UE, wherein the first serving cell is served or managed by the primary network node, obtaining information about a second PRACH configuration for PRACH transmission in a second cell, comparing the first and the second PRACH configurations, and determining based on at least the comparison whether or not the second cell is configured as the second serving cell of the UE, and informing the network node about the outcome of the determination. These steps may be performed in the wireless communication device 121, which is configured with at least one serving cell in MCG and is configured or being configured with at least one serving cell in SCG.

Figure 10:
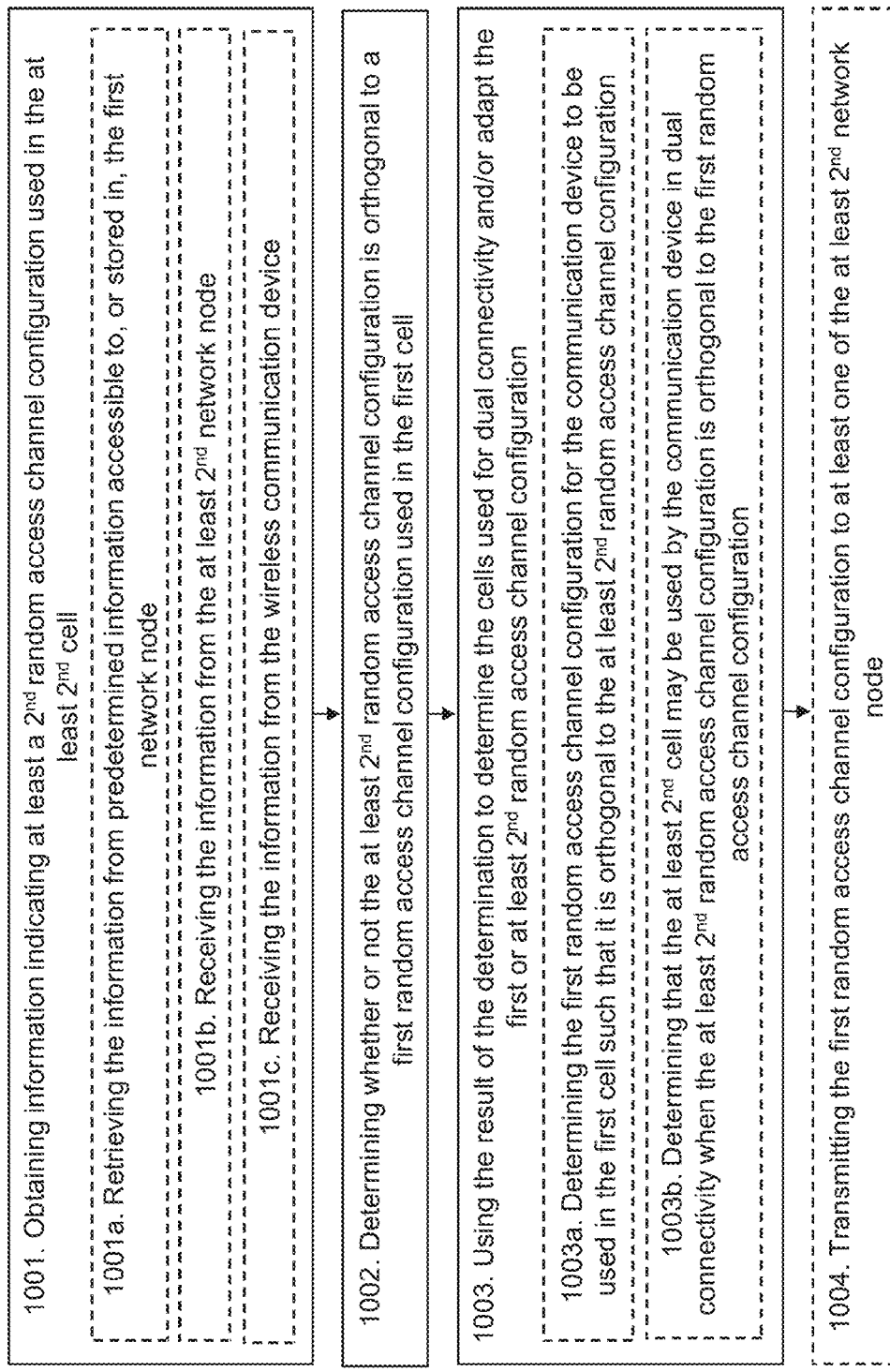
FIG. 10 is a flowchart depicting embodiments of a method in a network node.

Example of embodiments of a method performed by a first network node 110 for enabling improved random access transmissions of a wireless communication device 121 in a radio communications network 100, will now be described with reference to the flowchart depicted in FIG. 10. FIG. 10 illustrates an example of actions or operations which may be taken by the first network node 110. The communication device 121 is configurable for dual connectivity in a first cell 115 of the first network node 110 and at least a second cell 116, 117 of at least a second network node 111, 112.

Action 1001

First, the first network node 110 obtains information indicating at least a second random access channel configuration used in the at least second cell 116, 117.

This may, for example, be performed by retrieving, as shown by Action 301a, the information from predetermined information accessible to, or stored in, the first network node 110. Alternatively, this may be performed by receiving, as shown by Action 301b, the information from the at least second network node 111, 112, for example, in response to a request for a dual connectivity connection. Optionally, this may also be performed by receiving, as shown by Action 301c, the information from the wireless communication device 121, e.g. the information may comprise an explicit request to change the PRACH configuration in the first cell or implicit information related to the PRACH configuration of the second node 111, 112.

In some embodiments, the information indicates a subframe and/or a frame timing used in the at least second cell 116, 117 for random access transmissions.

Action 1002

In this action, the first network node 110 determines whether or not the at least second random access channel configuration is orthogonal to a first random access channel configuration in the first cell 115. Here, the first random access channel configuration and the at least second random access channel configuration may be considered orthogonal when random access transmissions from the wireless communication device 121 according to the first random access channel configuration does not overlap in time with random access transmissions from the wireless communication device 121 according at least second random access channel configuration.

Action 1003

After the determination in 1002, the first network node 110 may use the result of the determination in 1002 to determine the cells that may be used for dual connectivity by the wireless communication device 121 and/or to adapt the first or at least second random access channel configurations.

Action 1003a

In some embodiments, the first network node 110 may determine the first random access channel configuration for the wireless communication device 121 to be used in the first cell 115 such that it is orthogonal to the at least second random access channel configuration. This may, for example, be performed when the at least second cell 116, 117 is the primary cell, PCell, for the wireless communication device 121 when operating in dual connectivity and the first cell 115 is a secondary cell, PSCell, for the wireless communication device 121 when operating in dual connectivity. These embodiments may be referred to as a method performed by the first network node 110 for configuring orthogonal PRACH resources compared to neighboring network node or for informing neighboring nodes regarding orthogonal PRACH resources.

In some embodiments, the first network node 110 may configure the first PRACH such that it does not overlap in time with the second PRACH regardless of the relation between the timings of the frames and/or subframes of the first 115 and the second cells 116, 117. In some embodiments, the first network node 110 may change or re-configure its PRACH configuration, e.g. PRACH index, upon information or request received from the second node 111, 112. The changed or re-configured first PRACH configuration is orthogonal to the PRACH configuration in the second cell 116, 115.

In some embodiments, the selection of the PRACH configuration between network nodes 110, 111, 112 that support or may support DC operation may also be realized based on pre-defined rules.

One example of such pre-defined rules is that the first network node 110, which may be used as MeNB or used as the MeNB for at least N number of wireless communication devices operating in DC always has priority to choose its preferred PRACH configuration and inform this to the other network node(s), such as, the network node 111, 112. The other network nodes 111, 112, which may be used as SeNB or used as the SeNB for at least K number of wireless communication devices operating in DC follows accordingly by choosing different PRACH configuration, i.e. different with respect to the PRACH configuration that is used in the first network node 110.

Another example is that the first network node 110 may determine the first random access channel configuration for the wireless communication device 121 to be used in the first cell 115 when the at least second cell 116, 117 belongs to a first type of power classification and the first cell 115 belongs to a second type of power classification. This means that a network node of certain type(s) of power class, also known as BS power class, may autonomously choose its preferred PRACH configurations, while the network node(s) of other type of power class may follow accordingly by choosing another PRACH configuration. Examples of network nodes of different power class are macro, micro, pico and home network nodes. The macro, micro, pico and home network nodes are also interchangeably called as wide area, medium range, local area and femto network nodes. More specifically as an example the macro network node may choose its preferred PRACH configurations, while pico network nodes may follow accordingly by choosing another PRACH configuration i.e. orthogonal to that of the macro network node.

In order to ensure orthogonal PRACH in different network nodes, the network nodes 110, 111, 112 may exchange information. It should be noted that a network may or may not support dual connectivity, DC, operation. A network node may also decide to stop supporting or start supporting the DC operation. In some embodiments, the first network node 110 may inform one or more neighboring network nodes 111, 112 periodically, e.g. to other eNBs 111, 112 via X2 interface, or whenever dual connectivity operations are supported by the first network node 110. The first network node 110 may also provide additional information such as first network node's frame and/or subframe start timings and/or first PRACH configuration. The network node receiving the above mentioned information, e.g. at least second network node 111, 112 may thus adapt its PRACH configuration such that its PRACH configuration becomes orthogonal to that of the first network node 110. In some embodiments, the first network node 110 may only adapt its PRACH configuration only if it supports or is expected to support DC operation.

Action 1003b

In some embodiments, the first network node 110 may determine that the at least second cell 116, 117 may be used by the wireless communication device 121 in dual connectivity when the at least second random access channel configuration is orthogonal to the first random access channel configuration. This may, for example, be performed when the first cell 115 is the primary cell, PCell, for the wireless communication device 121 when operating in dual connectivity, and the at least second cell 116, 117 is a secondary PCell, PSCell, for the wireless communication device 121 when operating in dual connectivity. These embodiments may be referred to as a method performed by the first network node 110 for configuring a wireless communication device 121 with a serving cell based on PRACH configurations in network nodes.

This means that the first network node 110, in some embodiments, may choose a second serving cell of the wireless communication device 121 for DC operation such that the first 115 and the at least second serving cells 116, 117 have orthogonal PRACH configurations.

For example, it may be assumed that the wireless communication device 121 is configured with at least a PCell. In some implementations, the wireless communication device 121 may also be configured a PSCell belonging to SCG. After choosing or selecting the PSCell for the wireless communication device 121, the first network node 110 may informs the wireless communication device 121 to configure and activate the selected PSCell for DC operation. This means that the first network node 110 may determine that the at least second cell 116, 117 is to be used by the wireless communication device 121 for a dual connectivity operation, and may transmit, to the wireless communication device 121, information indicating that the wireless communication device 121 is to configure and activate the at least second cell 116, 117 for a dual connectivity operation.

More specifically, the first network node 110 may select the new PSCell or change the existing PSCell of the wireless communication device 121 belonging to the SCG such that the PRACH in the new or modified PSCell is orthogonal to that of the PCell of the wireless communication device 121.

To achieve the above objectives, the first network node 110 may obtain information about PRACH configurations in one or more neighboring cells 116, 117, as described in Action 1001. The first network node 110 may here also obtain information about the frame and/or subframe start timings of one or more of these neighboring cells. The above sets of information enable the first network node 110 to determine the most suitable PSCell with regards to its own PRACH configuration used in cell 115. If the first network node 110 determines more than one potential PSCell for the wireless communication device 121, then the first network node 110 may use one or more additional criteria to select the PSCell out of the eligible PSCells.

According to one example, the cell whose signal quality at the wireless communication device 121 is strongest among all the candidates PSCells may be selected by the first network node 110 as the PSCell for the wireless communication device 121. According to another example, the cell with least load (e.g. one with lowest mean transmit power and/or one serving lowest number of wireless communication devices) among the entire candidate PSCells may be selected as the PSCell for the wireless communication device 121. Thus, the first network node 110 may, when determined that more than one cell may be used by the wireless communication device 121 for a dual connectivity operation, further be configured to determine that one of the at least second cell 116, 117 is to be the primary secondary cell, PSCell, for a dual connectivity operation based on a criteria.

Action 1004

Optionally, in case a first random access channel configuration was determined in Action 1003, the first network node 110 may transmit the first random access channel configuration to at least one of the at least second network node 111, 112 in the radio communications network 100. This means that the first network node 110 may transmit the first PRACH configuration information, e.g. a PRACH index, to another network node which is potentially involved in serving any wireless communication device in dual connectivity manner. The second involved node may then use the received information to configure the orthogonal PRACH resources, e.g. PRACH with another PRACH configuration index which is orthogonal to the first PRACH.

In some embodiments, the determined first random access channel configuration may be transmitted as part of a request to at least one of the at least second network node 111, 112 to adapt the at least a second random access channel configuration to be orthogonal to the first random access channel configuration.

It should further be noted that in some embodiments, it may be pre-defined that if the wireless communication device 121 performs orthogonal PRACH transmissions on two serving cells of different CGs (e.g. in PCell and PSCell), then the delay within which the wireless communication device 121 shall be able to configure a PSCell in dual connectivity shall not include any delay caused by the PCell RACH. The orthogonal PRACH transmissions in different CGs (e.g. in MCG and SCG) may be realized based on any of the preceding embodiments described herein.

In other words, this means that the communication device 121 and/or the network node 110 may use the result of the determining of whether or not the at least second random access channel configuration is orthogonal to the first random access channel configuration, e.g. as described above in Action 903, to determine the time required by the communication device 121 to configure the at least second cell 116, 117.

The time or delay to configure a PSCell may be referred to as a PSCell configuration delay and the corresponding procedure is triggered upon the wireless communication device 121 receiving a request from the network node 110 (e.g. PCell) to configure a PSCell. The above mentioned pre-defined rule is explained in the example below. This means, for example, that the time T1 and the time T2 required by the communication device 121 to configure the at least second cell 116, 117, as described below, may be determined by the communication device 121 and/or the network node 110 based on a pre-defined rule.

Figure 13:
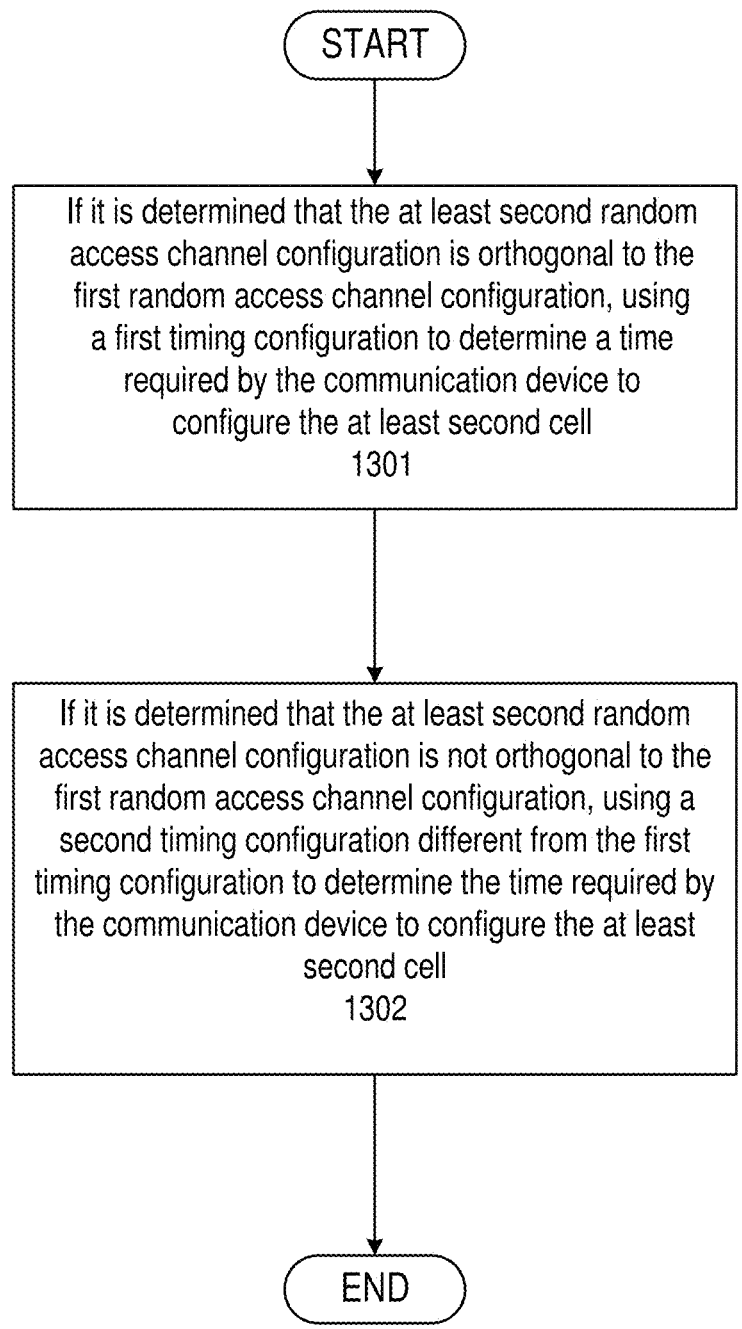
FIG. 13 is a flowchart depicting an embodiment of a method in a network node.

Referring to FIG. 13, in this example, if the PCell and PSCell RACH occasions are not orthogonal then the time or delay required by the wireless communication device 121 to configure a known PSCell is expressed (in ms) by the equation (Eq. 1) (Action 1301) as follows:

$$T_{config\_known\_PSCell} = 15 \text{ ms} + T_{activation\_time} + 50 \text{ ms} + T_{PCell\_IU} + T_{PSCell\_IU} \quad (Eq.\ 1)$$

wherein $T_{activation\_time}$ is the PSCell activation delay and may e.g. be 20 ms;

$T_{PCell\_IU}$ is the interruption uncertainty due to PCell PRACH preamble transmission and may be up to e.g. 20 ms in case PSCell activation is interrupted by a PCell PRACH preamble transmission, otherwise it is 0; and $T_{PSCell\_IU}$ is the interruption uncertainty in acquiring the first available PRACH occasion in the PSCell and may be up to e.g. 30 ms; also, the actual value of $T_{PSCell}$ depend upon the PRACH configuration used in the PSCell.

It should be noted that $T_{config\_known\_PSCell}$ may also be referred to herein as T2 or $T_{config\_PSCell}$ for the case when a known PSCell is configured i.e. known to the communication device 121 before it is configured at the communication device 121.

If the PCell and PSCell RACH occasions are not orthogonal then the time or delay required by the wireless communication device 121 to configure an unknown PSCell is expressed (in ms) by the equation (Eq. 2) as follows:

$$T_{config\_unknown\_PSCell} = 15 \text{ ms} + T_{activation\_time} + 50 \text{ ms} + T_{PCell\_IU} + T_{PSCell\_IU} \quad (Eq.\ 2)$$

It should be noted that $T_{config\_known\_PSCell}$ may also be referred to herein as T2 or $T_{config\_PSCell}$ for the case when an unknown PSCell is configured, i.e. not known to the communication device 121 before it is configured at the communication device 121.

A PSCell is considered to be known if following conditions are met for the PSCell (otherwise it is considered to be unknown):

during the last x seconds before the reception of the PSCell configuration command, wherein e.g. x=5s or x=max(5 measCycleSCell, 5 DRX cycles);

the wireless communication device 121 has sent a valid measurement report for the PSCell being configured;

the PSCell being configured remains detectable according to the cell identification conditions; and PSCell being configured also remains detectable during the PSCell configuration delay according to the cell identification conditions.

According to the pre-defined rule, the following adaptation in the PSCell configuration time is done, i.e. PCell RACH delay is excluded. In other words, this means that $T_{PCell\_IU} = 0$.

Referring to FIG. 13, if the PCell and PSCell RACH occasions are orthogonal then the time or delay required by the wireless communication device 121 to configure a known PSCell is expressed by the equation (Eq.3) (Action 1302) as follows:

$$T_{config\_known\_PSCell} = 15 \text{ ms} + T_{activation\_time} + 50 \text{ ms} + T_{PSCell\_IU} \quad (Eq.\ 3)$$

It should be noted that $T_{config\_known\_PSCell}$ may also be referred to herein as T1 or $T_{config\_PSCell}$ for the case when a known PSCell is configured, i.e. known to the communication device 121 before it is configured at the communication device 121.

If the PCell and PSCell RACH occasions are orthogonal then the time or delay required by the wireless communication device 121 to configure an unknown PSCell is expressed (in ms) by the equation (Eq. 4) as follows:

$$T_{config\_unknown\_PSCell} = 15\ \text{ms} + T_{activation\_time} 50\ \text{ms} + T_{PSCell\_IU} \quad \text{(Eq. 4)}$$

It should be noted that $T_{config\_known\_PSCell}$ may also be referred to herein as T1 or $T_{config\_PSCell}$ for the case when an unknown PSCell is configured, i.e. not known to the communication device 121 before it is configured at the communication device 121.

It thus follows that the time, T1, required by the communication device 121 to configure the at least second cell 116, 117 when the result of the determining is that the second random access channel configuration is orthogonal to the first random access channel configuration in some embodiments is shorter than the time, T2, required by the communication device 121 to configure the at least second cell 116, 117 when the result of the determining is that the second random access channel configuration is not orthogonal to the first random access channel configuration.

Furthermore, in other words, the time T1 required by the communication device 121 to configure the at least second cell 116, 117 does not include the time to perform random access on the first cell 115. Also, the time T2 required by the communication device 121 to configure the at least second cell 116, 117 includes the time to perform random access on the first cell 115.

According to another aspect of the method performed by the first network node 110 described above, the method may also be described as: obtaining information about at least a second PRACH configuration used for PRACH transmission in at least a second cell (e.g. neighbour cell), configuring in the primary network node a first PRACH configuration which is orthogonal to at least the second PRACH configuration, wherein orthogonal PRACH configuration implies that the first PRACH and second PRACH occasions occur in different time (e.g. subframes or frames), and transmitting (optionally) the first PRACH configuration to other nodes. These steps may be performed in a first network node 110, e.g. MeNB, etc., for a wireless communication device 121 configured with at least one serving cell in MCG and is configured or being configured with at least one serving cell in SCG.

According to a further aspect of the method performed by the first network node 110 described above, the method may also be described as: obtaining information about a first PRACH configuration for PRACH transmission in a first serving cell of the wireless communication device 121, wherein the first serving cell is served or managed by the primary network node, obtaining information about a second PRACH configuration for PRACH transmission in a second cell, and configuring the wireless communication device 121 with the second cell as the second serving cell of the wireless communication device 121 based on at least the relation between the first PRACH configuration and the second PRACH configuration. These steps may be performed in a first network node 110, e.g. primary network node, MeNB, etc., for a wireless communication device 121 configured with at least one serving cell in MCG and is configured or being configured with at least one serving cell in SCG.

Figure 11:
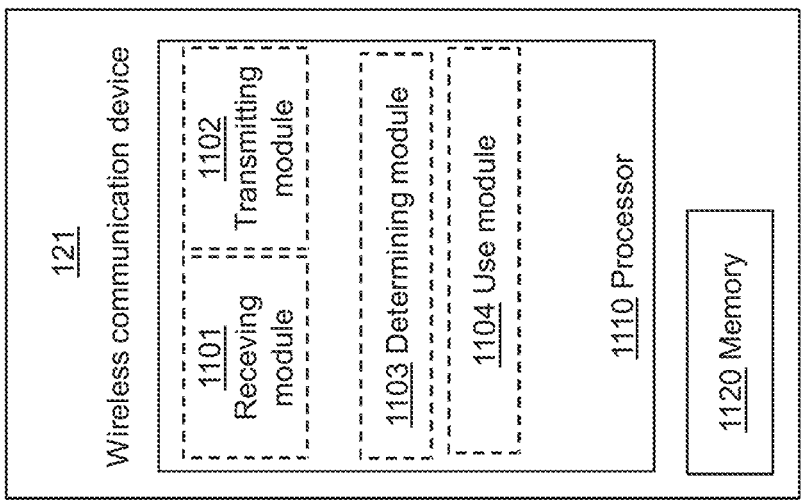
FIG. 11 is a schematic block diagram depicting embodiments of a wireless communication device.

To perform the method actions in a wireless communication device 121 for enabling improved random access transmissions in a radio communications network 100, as described above in relation to FIG. 9, the wireless communication device 121 may comprise the following arrangement depicted in FIG. 11. The communication device is configurable for dual connectivity in a first cell 115 of a first network node 110 and at least a second cell 116, 117 of at least a second network node 111, 112.

The wireless communication device 121 is configured to, e.g. by means of a receiving module 1101 being configured to, obtain information indicating a first random access channel configuration used in the first cell 115 and obtain information indicating at least a second random access channel configuration used in the at least second cell 116, 117. The receiving module 1101 may also be referred to as a receiver, RX, or receiving unit. The receiving module 1101 may also be a part of the processor 1110, or processing module, of the wireless communication device 121.

The wireless communication device 121 is also configured to, e.g. by means of a determining module 1103 being configured to, determine whether or not the at least second random access channel configuration is orthogonal to the first random access channel configuration. The determining module 1103 may also be a part of the processor 1110, or processing module, in the wireless communication device 121.

The wireless communication device 121 is further configured to, e.g. by means of a use module 1104 being configured to, use the result of the determination to cause a determination of cells used for dual connectivity and/or an adaptation of the first or at least second random access channel configuration. The use module 1104 may also be a part of the processor 1110, or processing module, in the wireless communication device 121.

In some embodiments, the wireless communication device 121 may further be configured to, e.g. by means of a transmitting module 1102 being configured to, transmit information indicating which of the at least second cell 116, 117 may be used for dual connectivity, or transmit information indicating that the first or at least second random access channel configuration should be adapted, or transmit random access transmissions using a third and fourth random access channel configurations instead of the first or at least second random access channel configuration, which third and fourth random access channel configurations are subset to first and at least second random access channel configurations respectively and orthogonal to each other. The transmitting module 1102 may also be referred to a transmitter, TX, or transmitting unit. The transmitting module 1102 may also be a part of the use module 1104 and/or the processor 1110, or processing module, in the wireless communication device 121.

Figure 12:
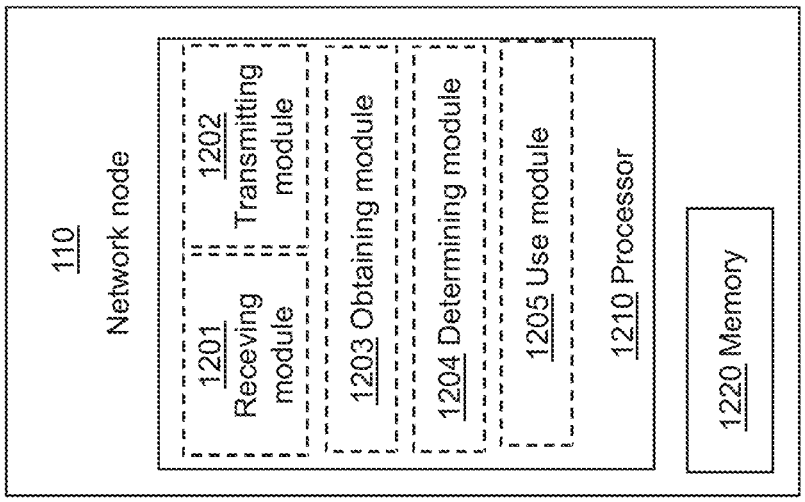
FIG. 12 is a schematic block diagram depicting embodiments of a network node.

To perform the method actions in a first network node 110 for enabling improved random access transmissions of a wireless communication device 121 in a radio communications network 100, as described above in relation to FIG. 10, the first network node 110 may comprise the following arrangement depicted in FIG. 12. The communication device is configurable for dual connectivity in a first cell 115 of a first network node 110 and at least a second cell 116, 117 of at least a second network node 111, 112.

The first network node 110 is configured to, e.g. by means of a receiving module 1201 or obtaining module 1203 being configured to, obtain information indicating at least a second random access channel configuration used in the at least second cell 116, 117. The receiving module 1201 may also be referred to as a receiver, RX, or receiving unit. The receiving module 1201 and the obtaining module 1203 may also be a part of a processor 1210, or processing module, in the first network node 110.

Also, the first network node 110 is configured to, e.g. by means of a determining module 1204 being configured to, determine whether or not the at least second random access channel configuration is orthogonal to a first random access channel configuration in the first cell 115. The determining module 1203 may also be a part of the processor 1210, or processing module, in the first network node 110.

The first network node 110 is further configured to, e.g. by means of a use module 1205 being configured to, use the result of the determination to determine the cells that may be used for dual connectivity by the wireless communication device 121 and/or to adapt the first or at least second random access channel configurations. The use module 1204 may also be a part of the processor 1210, or processing module, of the first network node 110.

In some embodiments, the first network node 110 may further be configured to, e.g. by means of a transmitting module 1202 being configured to, transmit the first random access channel configuration to at least one of the at least second network node 111, 112 in the radio communications network 100. The transmitting module 1202 may also be referred to a transmitter, TX, or transmitting unit. The transmitting module 1202 may also be a part of the processor 1210, or processing module, in the first network node 110.

The embodiments for enabling improved random access transmissions in a radio communications network 100 may be implemented through one or more processors, such as, e.g. the processor 1110 in the wireless communication device 121 depicted in FIG. 11 and the processor 1210 in the network node 110 depicted in FIG. 12, together with computer program code for performing the functions and actions of the embodiments therein. The program code mentioned above may also be provided as a computer program product, for instance in the form of a data carrier carrying computer program code or code means for performing the embodiments herein when being loaded into the processor 1110 in the wireless communication device 121 and the processor 1210 in the network node 110, respectively. The computer program code may e.g. be provided as pure program code in the wireless communication device 121 and in the network node 110, or on a server and downloaded to the wireless communication device 121 and the network node 110, respectively. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The wireless communication device 121 and the network node 110 may further comprise a memory 1120, 1220, respectively, which may be referred to or comprise one or more memory modules or units. The memory 1120, 1220 may be arranged to be used to store executable instructions and data to perform the methods described herein when being executed in the wireless communication device 121 and in network node 110, respectively. Those skilled in the art will also appreciate that the processors 1110, 1210 and their respective memories 1120, 1220 described above may refer to a combination of analog and digital circuits, and/or one or more processors configured with software and/or firmware, e.g. stored in the memory 1120, 1220, that when executed by the one or more processors such as the processors 1110, 1210 perform the methods as described above. One or more of the processors 1110, 1210 and their respective memories 1120, 1220, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that the embodiments may further comprise a computer program product, comprising instructions which, when executed on at least one processor, e.g. the processors 1110, 1210, cause the at least one processor to carry out the method for enabling improved random access transmissions in a radio communications network 100. Also, some embodiments may, as described above, further comprise a carrier containing said computer program, wherein the carrier is one of an electronic signal, optical signal, radio signal, or computer readable storage medium.

The terminology used in the detailed description of the particular embodiments illustrated in the accompanying drawings is not intended to be limiting of the described network node, the communication device or methods therein.

The following commonly terminologies are used in the embodiments and are elaborated below.

Network Node: In some embodiments a more general term "network node" is used and it may correspond to any type of radio network node or any network node, which communicates with a UE and/or with another network node. Examples of network nodes are NodeB, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc. Further examples of network nodes are NodeB, MeNB, SeNB, a network node belonging to MCG or SCG, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc), O&M, OSS, SON, positioning node (e.g. E-SMLC), MDT etc.

User Equipment: In some embodiments the non-limiting term user equipment (UE) is used and it refers to any type of wireless device communicating with a network node and/or with another UE in a cellular or mobile communication system. Examples of UE are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles etc. Further examples of UEs are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles etc.

PRACH: The term is used throughout the embodiments for random access transmissions. However, the PRACH transmission may comprise of any type of signal sent by the UE on a random access channel. Examples of random access signals are a preamble, Random Access preamble, a sequence of pre-defined signal, etc.

The embodiments are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

The embodiments are described for LTE. However the embodiments are applicable to any RAT or multi-RAT systems, where the UE receives and/or transmit signals (e.g. data) e.g. LTE FDD/TDD, WCDMA/HSPA, GSM/GERAN, Wi Fi, WLAN, CDMA2000 etc. It is straight-forward to extend the concepts to FDD-FDD inter-band, or TDD-TDD inter-band or TDD intra-band, or to a combination of FDD and TDD inter-band carriers. The descriptions are also equally applicable to more than one SeNBs. In this IvD, we mention PSCell as the Secondary PCell, meaning the cell in the SeNB with PCell-type structure. In some literature, this is also mentioned as PUCCH Scell, since this is SCell that carrier PUCCH. In some literature, this is also notified as Primary SCell, since the main SCell in SeNB which has PCell type behavior and structure.

Furthermore, one object of embodiments herein is to improve random access transmissions in a radio communications network. Various exemplary embodiments are set out in the following statements:

According to a first statement, the object may be achieved by a method performed by a communication device for enabling improved random access transmissions in a radio communications network. The communication device is configurable for dual connectivity in a first cell of a first network node and at least a second cell of at least a second network node. The communication device obtains information indicating a first random access channel configuration used in the first cell. Also, the communication device obtains information indicating at least a second random access channel configuration used in the at least second cell. Then, the communication device determine whether or not the at least second random access channel configuration is orthogonal to the first random access channel configuration. Furthermore, the communication device uses the result of the determination to cause a determination of cells used for dual connectivity and/or an adaptation of the first or at least second random access channel configuration.

It should be noted that the first random access channel configuration and the at least second random access channel configuration may be determined as orthogonal when random access transmissions according to the first random access channel configuration does not overlap in time with random access transmissions according at least second random access channel configuration, i.e. the first and the second random access channel configurations are orthogonal with respect to each other if their respective random access occasions occur in different time resources.

In some embodiments, the communication device may transmit to the first network node and/or the at least second network node, information indicating which of the first and at least second cell may be used for dual connectivity based on the determination. In this case, the cells of the first and at least second cell which may be used for dual connectivity may be determined by the communication device based on the signal quality of the cells at the communication device (e.g. the largest RSRQ measured by the communication device) and/or on when the next random access transmissions occurs in respective cell. Furthermore, in this case, the information may further indicate which cells of the first and at least second cell may be used as the primary cell, PCell, for the communication device when operating in dual connectivity, and which cells of the first and at least second cell may be used as secondary cell, SCell, for the communication device when operating in dual connectivity.

In some embodiments, the communication device may transmit to the first network node and/or the at least second network node, information indicating that the first or at least second random access channel configuration should be adapted based on the determination. In this case, the transmission may be performed based on expected or occurred failures or delays of random access transmissions by the communication device using the first or at least second random access channel configurations. Furthermore, the information may further indicate statistical information based on expected or occurred failures or delays of random access transmissions by the communication device using the first or at least second random access channel configuration. Optionally, the information may comprise an explicit request to the first network node and/or the at least second network node to change the first or at least second random access channel configuration such that the first and at least second random access channel configurations are orthogonal with respect to each other.

In some embodiments, the communication device may transmit random access transmissions using a third and at least fourth random access channel configuration instead of the first or at least second random access channel configuration, which third and at least fourth random access channel configuration are subset to first and at least second random access channel configuration respectively and orthogonal to each other.

In some embodiments, the communication device may determine whether or not the transmission power that is available for simultaneous random access transmissions using the first and/or at least second random access channel configuration is below a determined threshold. In case the available transmission power is below the determined threshold, perform orthogonal random access transmissions using the third and at least fourth random access channel configuration.

In some embodiments, the communication device may transmit the third and/or at least fourth random access channel configuration to the first network node and/or the at least second network node.

According to a second statement, the object may be achieved by a method performed by a first network node for enabling improved random access transmissions of a communication device in a radio communications network. The communication device is configurable for dual connectivity in a first cell of the first network node and at least a second cell of at least a second network node. The first network node obtains information indicating at least a second random access channel configuration used in the at least second cell. Then, the first network node determines whether or not the at least second random access channel configuration is orthogonal to a first random access channel configuration in the first cell. Furthermore, the first network node uses the result of the determination to determine the cells that may be used for dual connectivity by the communication device and/or to adapt the first or at least second random access channel configurations.

It should be noted that the first random access channel configuration and the at least second random access channel configuration may be determined as orthogonal when random access transmissions from the communication device according to the first random access channel configuration does not overlap in time with random access transmissions from the communication device according at least second random access channel configuration, i.e. the first and the second random access channel configurations are orthogonal with respect to each other if their respective random access occasions occur in different time resources.

In some embodiments, the information may indicate a subframe and/or a frame timing used in the at least second cell for random access transmissions. In some embodiments, the first network node may obtain the information by one or more of: retrieving the information from predetermined information accessible to, or stored in, the first network node; receiving the information from the at least second network node; and receiving the information from the communication device.

In some embodiments, the first network node may determine the first random access channel configuration for the communication device to be used in the first cell such that it is orthogonal to the at least second random access channel configuration. This may, for example, be performed when the at least second cell is the primary cell, PCell, for the communication device when operating in dual connectivity and the first cell is a secondary cell, PSCell, for the communication device when operating in dual connectivity. Optionally, this may be performed when the at least second cell belongs to a first type of power classification and the first cell belongs to a second type of power classification.

In some embodiments, the first network node may determine that the at least second cell may be used by the communication device in dual connectivity when the at least second random access channel configuration is orthogonal to the first random access channel configuration. This may, for example, be performed when the first cell is the primary cell, PCell, for the communication device when operating in dual connectivity and the at least second cell is a secondary cell, PSCell, for the communication device when operating in dual connectivity. Here, the first network node may further determine that the at least second cell is to be used by the communication device for a dual connectivity operation, and transmitting, to the communication device, information indicating that the communication device is to configure and activate the at least second cell for a dual connectivity operation.

Furthermore, in some embodiments, the first network node may, when determining that more than one cell may be used by the communication device for a dual connectivity operation, further determine that one of the at least second cell is to be the primary secondary cell for a dual connectivity operation based on a criteria. The criteria may, for example, comprise selecting the cell of the at least second cell that has the highest/strongest signal quality or the least load (e.g. lowest mean transmit power and/or lowest number of served communication devices).

In some embodiments, the first network node may transmit the first random access channel configuration to at least one of the at least second network node in the radio communications network. In this case, the first random access channel configuration may be transmitted as part of a request to at least one of the at least second network node to adapt the at least a second random access channel configuration to be orthogonal to the first random access channel configuration.

According to a third and fourth statement, the object may be achieved by a wireless communication device and a first network node for performing the methods described above, respectively.

By having a first network node or communication device configured as described in the statements above, it may be ensured that the random access configurations in a primary cell, PCell, and a secondary cell, PSCell, of the communication device are orthogonal with respect to each other, i.e. their random access occasions are non-overlapping in time. Alternatively, it may be ensured that the communication device is selected and configured with those PCell and PSCell whose random access configurations are orthogonal with respect to each other. According to another alternative, the communication device may recommend a set of cells as potential PCell and PSCell whose random access configurations are orthogonal with respect to each other. Hence, random access transmissions in the radio communications network are improved.

An advantage of having a network node or communication device configured as described in the statements above is that the communication device will not have to send two RA transmissions in the same subframes. This may be very advantageous and beneficial in power limited cases. Also, this could avoid random access transmissions while PSCell is being activated or deactivated.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

ABBREVIATIONS

MeNB Master eNode B
SeNB Secondary eNode B

PSCell Primary SCell
PCC Primary component carrier
PCI Physical cell identity
PSS Primary synchronization signal
RAT Radio Access Technology
RRC Radio resource control
RSCP Received signal code power
RSRP Reference Signal Received Power
RSRQ Reference Signal Received Quality
RSSI Received signal strength indication
SCC Secondary component carrier
SIB System information block
SON Self-organizing networks
SSS Secondary synchronization signal
TDD Time division duplex
UARFCN UMTS Absolute Radio Frequency Channel Number
HO Handover
UE User equipment
RNC Radio Network Controller
BSC Base station Controller
PCell Primary Cell
SCell Secondary Cell
PRACH Physical random access channel
RACH Random Access Channel

The invention claimed is:

1. A method performed by a communication device for enabling improved random access transmissions in a radio communications network, the communication device being configurable for dual connectivity in a first cell of a first network node and at least a second cell of at least a second network node, the method comprising:
obtaining information indicating a first random access channel configuration used in the first cell;
obtaining information indicating at least a second random access channel configuration used in the at least second cell;
determining whether or not the at least second random access channel configuration is orthogonal to the first random access channel configuration;
when it is determined that the at least second random access channel configuration is orthogonal to the first random access channel configuration:
using a first timing configuration to determine a first time required by the communication device to configure the at least second cell; and
when it is determined that the at least second random access channel configuration is not orthogonal to the first random access channel configuration:
using a second timing configuration different from the first timing configuration to determine a second time required by the communication device to configure the at least second cell.

2. The method of claim 1, wherein the first time required by the communication device to configure the at least second cell when a result of the determining is that the second random access channel configuration is orthogonal to the first random access channel configuration is shorter than the second time required by the communication device to configure the at least second cell when a result of the determining is that the second random access channel configuration is not orthogonal to the first random access channel configuration.

3. The method of claim 1, wherein when a result of the determining is that the second random access channel configuration is orthogonal to the first random access channel configuration:
the first time required by the communication device to configure the at least second cell does not include a time to perform random access on the first cell; and
when the result of the determining is that the second random access channel configuration is not orthogonal to the first random access channel configuration:
the second time required by the communication device to configure the at least second cell includes the time to perform random access on the first cell.

4. The method of claim 1, wherein the first time and the second time required by the communication device to configure the at least second cell are determined by the communication device based on a pre-defined rule.

5. The method of claim 1, wherein the first random access channel configuration and the at least second random access channel configuration are orthogonal with respect to each other when random access transmissions from the communication device according to the first random access channel configuration do not overlap in time with random access transmissions from the communication device according to at least second random access channel configuration.

6. The method of claim 1, wherein the first cell belongs to a Master Cell Group, MCG, and the second cell belongs to a Secondary Cell Group, SCG.

7. A communication device for enabling improved random access transmissions in a radio communications network, the communication device being configurable for dual connectivity in a first cell of a first network node and at least a second cell of at least a second network node, the communication device being configured to:
obtain information indicating a first random access channel configuration used in the first cell;
obtain information indicating at least a second random access channel configuration used in the at least second cell;
determine whether or not the at least second random access channel configuration is orthogonal to the first random access channel configuration;
when it is determined that the at least second random access channel configuration is orthogonal to the first random access channel configuration:
use a first timing configuration to determine a first time required by the communication device to configure the at least second cell; and
when it is determined that the at least second random access channel configuration is not orthogonal to the first random access channel configuration:
use a second timing configuration different from the first timing configuration to determine a second time required by the communication device to configure the at least second cell.

8. The communication device of claim 7, wherein the first time required by the communication device to configure the at least second cell when a result of the determining is that the second random access channel configuration is orthogonal to the first random access channel configuration is shorter than the second time required by the communication device to configure the at least second cell when a result of the determining is that the second random access channel configuration is not orthogonal to the first random access channel configuration.

9. The communication device of claim 7, wherein when a result of the determining is that the second random access channel configuration is orthogonal to the first random access channel configuration:

the first time is required by the communication device to configure the at least second cell does not include a time to perform random access on the first cell; and when the result of the determining is that the second random access channel configuration is not orthogonal to the first random access channel configuration:

the second time is required by the communication device to configure the at least second cell includes the time to perform random access on the first cell.

10. The communication device of claim 7, wherein the communication device is configured to determine the first time and the second time required by the communication device to configure the at least second cell based on a pre-defined rule.

11. The communication device of claim 7, wherein the first random access channel configuration and the at least second random access channel configuration are orthogonal when random access transmissions from the communication device according to the first random access channel configuration do not overlap in time with random access transmissions from the communication device according at least second random access channel configuration.

12. The communication device of claim 7, further comprising a processor and a memory, wherein the memory contains instructions executable by the processor to:

obtain information indicating the first random access channel configuration used in the first cell;

obtain information indicating at least the second random access channel configuration used in the at least second cell;

determine whether or not the at least second random access channel configuration is orthogonal to the first random access channel configuration;

when it is determined that the at least second random access channel configuration is orthogonal to the first random access channel configuration:

use a first timing configuration to determine a first time required by the communication device to configure the at least second cell; and when it is determined that the at least second random access channel configuration is not orthogonal to the first random access channel configuration:

use a second timing configuration different from the first timing configuration to determine a second time required by the communication device to configure the at least second cell.

13. A method performed by a first network node for enabling improved random access transmissions of a communication device in a radio communications network, the communication device being configurable for dual connectivity in a first cell of the first network node and at least a second cell of at least a second network node, the method comprising:

obtaining information indicating at least a second random access channel configuration used in the at least second cell;

determining whether or not the at least second random access channel configuration is orthogonal to a first random access channel configuration in the first cell;

when it is determined that the at least second random access channel configuration is orthogonal to the first random access channel configuration:

using a first timing configuration to determine a first time required by the communication device to configure the at least second cell; and when it is determined that the at least second random access channel configuration is not orthogonal to the first random access channel configuration:

using a second timing configuration different from the first timing configuration to determine a second time required by the communication device to configure the at least second cell.

14. The method of claim 13, wherein the first time required by the communication device to configure the at least second cell when a result of the determining is that the second random access channel configuration is orthogonal to the first random access channel configuration is shorter than the second time required by the communication device to configure the at least second cell when a result of the determining is that the second random access channel configuration is not orthogonal to the first random access channel configuration.

15. The method of claim 13, wherein when a result of the determining is that the second random access channel configuration is orthogonal to the first random access channel configuration:

the first time required by the communication device to configure the at least second cell does not include a time to perform random access on the first cell; and when the result of the determining is that the second random access channel configuration is not orthogonal to the first random access channel configuration:

the second time is required by the communication device to configure the at least second cell includes the time to perform random access on the first cell.

16. The method of claim 13, wherein the first time and the second time required by the communication device to configure the at least second cell are determined by the first network node based on a pre-defined rule.

17. The method of claim 13, wherein the first random access channel configuration and the at least second random access channel configuration are orthogonal with respect to each other when random access transmissions from the communication device according to the first random access channel configuration do not overlap in time with random access transmissions from the communication device according to at least second random access channel configuration.

18. The method of claim 13, wherein the first cell belongs to a Master Cell Group, MCG, and the second cell belongs to a Secondary Cell Group, SCG.

19. A first network node for enabling improved random access transmissions of a communication device in a radio communications network, the communication device being configurable for dual connectivity in a first cell of the first network node and at least a second cell of at least a second network node, the first network node being configured to:

obtain information indicating at least a second random access channel configuration used in the at least second cell;

determine whether or not the at least second random access channel configuration is orthogonal to a first random access channel configuration in the first cell;

when it is determined that the at least second random access channel configuration is orthogonal to the first random access channel configuration:

use a first timing configuration to determine a first time required by the communication device to configure the at least second cell; and when it is determined that the at least second random access channel configuration is not orthogonal to the first random access channel configuration:

use a second timing configuration different from the first timing configuration to determine a second time required by the communication device to configure the at least second.

20. The first network node of claim 19, wherein the first time required by the communication device to configure the at least second cell when a result of the determining is that the second random access channel configuration is orthogonal to the first random access channel configuration is shorter than the second time required by the communication device to configure the at least second cell when a result of the determining is that the second random access channel configuration is not orthogonal to the first random access channel configuration.

21. The first network node of claim 19, wherein when a result of the determining is that the second random access channel configuration is orthogonal to the first random access channel configuration:
   the first time required by the communication device to configure the at least second cell does not include a time to perform random access on the first cell; and
   when the result of the determining is that the second random access channel configuration is not orthogonal to the first random access channel configuration:
   the second time required by the communication device to configure the at least second cell includes the time to perform random access on the first cell.

22. The first network node of claim 19, wherein the first network node is configured to determine the first time and the second time required by the communication device to configure the at least second cell based on a pre-defined rule.

23. The first network node of claim 19, wherein the first random access channel configuration and the at least second random access channel configuration are orthogonal when random access transmissions from the communication device according to the first random access channel configuration do not overlap in time with random access transmissions from the communication device according at least second random access channel configuration.

24. The first network node of claim 19, further comprising a processor and a memory, wherein the memory contains instructions executable by the processor to:
   obtain the information indicating at least the second random access channel configuration used in the at least second cell;
   determine whether or not the at least second random access channel configuration is orthogonal to the first random access channel configuration in the first cell;
   when it is determined that the at least second random access channel configuration is orthogonal to the first random access channel configuration:
      use a first timing configuration to determine a first time required by the communication device to configure the at least second cell; and
   when it is determined that the at least second random access channel configuration is not orthogonal to the first random access channel configuration:
      use a second timing configuration different from the first timing configuration to determine a second time required by the communication device to configure the at least second cell.

25. A non-transitory computer readable medium, comprising instructions which, when executed by at least one processor, cause the at least one processor to carry out a method on a communication device for enabling improved random access transmissions in a radio communications network, the communication device being configurable for dual connectivity in a first cell of a first network node and at least a second cell of at least a second network node, the method comprising:
   obtaining information indicating a first random access channel configuration used in the first cell;
   obtaining information indicating at least a second random access channel configuration used in the at least second cell;
   determining whether or not the at least second random access channel configuration is orthogonal to the first random access channel configuration;
   when it is determined that the at least second random access channel configuration is orthogonal to the first random access channel configuration:
      using a first timing configuration to determine a first time required by the communication device to configure the at least second cell; and
   when it is determined that the at least second random access channel configuration is not orthogonal to the first random access channel configuration:
      using a second timing configuration different from the first timing configuration to determine a second time required by the communication device to configure the at least second cell.

26. A non-transitory computer readable medium, comprising instructions which, when executed by at least one processor, cause the at least one processor to carry out a method on a first network node for enabling improved random access transmissions of a communication device in a radio communications network, the communication device being configurable for dual connectivity in a first cell of the first network node and at least a second cell of at least a second network node, the method comprising:
   obtaining information indicating at least a second random access channel configuration used in the at least second cell;
   determining whether or not the at least second random access channel configuration is orthogonal to a first random access channel configuration in the first cell;
   when it is determined that the at least second random access channel configuration is orthogonal to the first random access channel configuration:
      using a first timing configuration to determine a first time required by the communication device to configure the at least second cell; and
   when it is determined that the at least second random access channel configuration is not orthogonal to the first random access channel configuration:
      using a second timing configuration different from the first timing configuration to determine a second time required by the communication device to configure the at least second cell.

* * * * *

UNITED STATES PATENT AND TRADEMARK OFFICE
CERTIFICATE OF CORRECTION

PATENT NO. : 9,730,248 B2
APPLICATION NO. : 14/442581
DATED : August 8, 2017
INVENTOR(S) : Rahman et al.

It is certified that error appears in the above-identified patent and that said Letters Patent is hereby corrected as shown below:

On the Title Page

In Item (72), under "Inventors", in Column 1, Line 1, delete "Imadur Rahman," and insert
-- Muhammad Imadur Rahman, --, therefor.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*